US007539337B2

(12) United States Patent
Simanovsky et al.

(10) Patent No.: US 7,539,337 B2
(45) Date of Patent: May 26, 2009

(54) METHOD OF AND SYSTEM FOR SPLITTING COMPOUND OBJECTS IN MULTI-ENERGY COMPUTED TOMOGRAPHY IMAGES

(75) Inventors: Sergey Simanovsky, Brookline, MA (US); Zhengrong Ying, Wakefield, MA (US); Carl R. Crawford, Brookline, MA (US)

(73) Assignee: Analogic Corporation, Peabody, MA (US)

( * ) Notice: Subject to any disclaimer, the term of this patent is extended or adjusted under 35 U.S.C. 154(b) by 744 days.

(21) Appl. No.: 11/183,378

(22) Filed: Jul. 18, 2005

(65) Prior Publication Data

US 2007/0014471 A1    Jan. 18, 2007

(51) Int. Cl.
  *G06K 9/00*    (2006.01)
(52) U.S. Cl. ..................................... 382/131
(58) Field of Classification Search .................. None
  See application file for complete search history.

(56) References Cited

U.S. PATENT DOCUMENTS

| 4,029,963 | A |   | 6/1977  | Alvarez et al. ............. 250/360 |
| 4,149,081 | A | * | 4/1979  | Seppi .......................... 378/5 |
| 4,537,120 | A |   | 8/1985  | Josefsson ................. 98/115.2 |
| 4,759,047 | A |   | 7/1988  | Donges et al. ................. 378/57 |
| 4,884,289 | A |   | 11/1989 | Glockmann et al. ........... 378/57 |
| 5,132,988 | A |   | 7/1992  | Fisher et al. .................. 375/11 |
| 5,132,998 | A |   | 7/1992  | Tsutsui et al. ................ 378/99 |
| 5,182,764 | A |   | 1/1993  | Peschmann et al. ........... 378/57 |
| 5,247,561 | A |   | 9/1993  | Kotowski .................... 378/87 |
| 5,319,547 | A |   | 6/1994  | Krug et al. .................. 364/409 |
| 5,367,552 | A |   | 11/1994 | Peschmann ................... 378/57 |
| 5,410,617 | A | * | 4/1995  | Kidd et al. .................. 382/169 |
| 5,473,657 | A |   | 12/1995 | McKenna ...................... 378/4 |
| 5,490,218 | A |   | 2/1996  | Krug et al. .................. 382/100 |
| 5,661,774 | A |   | 8/1997  | Gordon et al. .............. 378/101 |
| 5,712,926 | A | * | 1/1998  | Eberhard et al. ............ 382/205 |
| 5,802,134 | A |   | 9/1998  | Larson et al. |
| 5,881,122 | A |   | 3/1999  | Ruth et al. |
| 5,887,047 | A |   | 3/1999  | Ruth et al. |
| 5,901,198 | A |   | 5/1999  | Ruth et al. |

(Continued)

FOREIGN PATENT DOCUMENTS

DE          3150306 A1    12/1981

(Continued)

OTHER PUBLICATIONS

Alverez, R. E., et al., "Energy-selective Reconstruction in X-ray Computerized Tomography", Phys. Med. Biol. 1976, Vo. 21, No. 5, 733-744.

(Continued)

*Primary Examiner*—Matthew C Bella
*Assistant Examiner*—Alex Liew
(74) *Attorney, Agent, or Firm*—McDermott Will & Emery

(57) ABSTRACT

A method of and a system for splitting a compound object using multi-energy CT data including a density and an atomic number measurements are provided. The method comprises: compound object detection; computing a two-dimensional DZ distribution of a compound object; identifying clusters within the DZ distribution; assigning a component label to each object voxel based on the DZ distribution clusters; and post-processing the set of voxels identified as belonging to each component.

16 Claims, 9 Drawing Sheets

U.S. PATENT DOCUMENTS

| | | | |
|---|---|---|---|
| 5,909,477 | A | 6/1999 | Ruth et al. |
| 5,932,874 | A | 8/1999 | Legg et al. |
| 5,937,028 | A | 8/1999 | Tybinkowski et al. |
| 5,949,842 | A | 9/1999 | Schafer et al. |
| 5,970,113 | A | 10/1999 | Ruth et al. |
| 5,982,843 | A | 11/1999 | Bailey et al. |
| 5,982,844 | A | 11/1999 | Tybinkowski et al. |
| 6,026,143 | A | 2/2000 | Simanovsky et al. |
| 6,026,171 | A | 2/2000 | Hiraoglu et al. |
| 6,035,014 | A | 3/2000 | Hiraoglu et al. |
| 6,067,366 | A | 5/2000 | Simanovsky et al. |
| 6,075,871 | A | 6/2000 | Simanovsky et al. |
| 6,076,400 | A | 6/2000 | Bechwati et al. |
| 6,078,642 | A | 6/2000 | Simanovsky et al. |
| 6,091,795 | A | 7/2000 | Schafer et al. |
| 6,108,396 | A | 8/2000 | Bechwati et al. |
| 6,111,974 | A | 8/2000 | Hiraoglu et al. |
| 6,128,365 | A | 10/2000 | Bechwati et al. |
| 6,195,444 | B1 | 2/2001 | Simanovsky et al. |
| 6,256,404 | B1 | 7/2001 | Gordon et al. |
| 6,272,230 | B1 | 8/2001 | Hiraoglu et al. |
| 6,317,509 | B1 | 11/2001 | Simanovsky et al. |
| 6,345,113 | B1 | 2/2002 | Crawford et al. |
| 6,687,326 | B1 | 2/2004 | Bechwati et al. |
| 6,721,387 | B1 | 4/2004 | Naidu et al. |
| 6,748,043 | B1 | 6/2004 | Dobbs |
| 6,813,374 | B1 | 11/2004 | Karimi et al. |
| 2002/0012449 | A1* | 1/2002 | Bradski .................... 382/103 |
| 2003/0169914 | A1* | 9/2003 | Launay et al. ............. 382/132 |
| 2005/0238232 | A1 | 10/2005 | Ying et al. |
| 2005/0259781 | A1 | 11/2005 | Ying et al. |
| 2005/0271293 | A1 | 12/2005 | Ying et al. |
| 2005/0276373 | A1 | 12/2005 | Ying et al. |
| 2005/0276468 | A1 | 12/2005 | Ying et al. |
| 2006/0002585 | A1 | 1/2006 | Larson et al. |
| 2006/0023844 | A1 | 2/2006 | Naidu et al. |
| 2006/0039599 | A1 | 2/2006 | Deykoon et al. |
| 2006/0072703 | A1 | 4/2006 | Naidu et al. |

FOREIGN PATENT DOCUMENTS

| | | |
|---|---|---|
| WO | WO 96/13017 | 5/1996 |

OTHER PUBLICATIONS

Lehmann, L. A., et al., "Generalized Image Combinations In Dual KVP Digital Radiography", Med. Phys. 8, 659-667 (1981).

Chuang, K., et al., "A Fast Dual-Energy Computational Method Using Isotransmission Lines And Tables", Med. Phys. 14, 186-192 (1987).

* cited by examiner

METHOD OF AND SYSTEM FOR SPLITTING COMPOUND OBJECTS IN MULTI-ENERGY COMPUTED TOMOGRAPHY IMAGES

RELATED APPLICATIONS

This patent application and/or patents are related to the following co-pending U.S. applications and/or issued U.S. patents, of the assignee as the present application, the contents of which are incorporated herein in their entirety by reference:

"Dual energy power supply," invented by Bernard M. Gordon, et al., U.S. Pat. No. 5,661,771, issued on Aug. 26, 1997;

"Nutating Slice CT Image Reconstruction Apparatus and Method," invented by Gregory L. Larson, et al., U.S. application Ser. No. 08/831,558, filed on Apr. 9, 1997, now U.S. Pat. No. 5,802,134, issued on Sep. 1, 1998;

"Computed Tomography Scanner Drive System and Bearing," invented by Andrew P. Tybinkowski, et al., U.S. application Ser. No. 08/948,930, filed on Oct. 10, 1997, now U.S. Pat. No. 5,982,844, issued on Nov. 9, 1999;

"Air Calibration Scan for Computed Tomography Scanner with Obstructing Objects," invented by David A. Schafer, et al., U.S. application Ser. No. 08/948,937, filed on Oct. 10, 1997, now U.S. Pat. No. 5,949,842, issued on Sep. 7, 1999;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997, now U.S. Pat. No. 5,970,113, issued on Oct. 19, 1999;

"Computed Tomography Scanning Target Detection Using Non-Parallel Slices," invented by Christopher C. Ruth, et al., U.S. application Ser. No. 08/948,491, filed on Oct. 10, 1997, now U.S. Pat. No. 5,909,477, issued on Jun. 1, 1999;

"Computed Tomography Scanning Target Detection Using Target Surface Normals," invented by Christopher C. Ruth, et al., U.S. application Ser. No. 08/948,929, filed on Oct. 10, 1997, now U.S. Pat. No. 5,901,198, issued on May 4, 1999;

"Parallel Processing Architecture for Computed Tomography Scanning System Using Non-Parallel Slices," invented by Christopher C. Ruth, et al., U.S. application Ser. No. 08/948,697, filed on Oct. 10, 1997, U.S. Pat. No. 5,887,047, issued on Mar. 23, 1999;

"Computed Tomography Scanning Apparatus and Method For Generating Parallel Projections Using Non-Parallel Slice Data," invented by Christopher C. Ruth, et al., U.S. application Ser. No. 08/948,492, filed on Oct. 10, 1997, now U.S. Pat. No. 5,881,122, issued on Mar. 9, 1999;

"Computed Tomography Scanning Apparatus and Method Using Adaptive Reconstruction Window," invented by Bernard M. Gordon, et al., U.S. application Ser. No. 08/949,127, filed on Oct. 10, 1997, now U.S. Pat. No. 6,256,404, issued on Jul. 3, 2001;

"Area Detector Array for Computed Tomography Scanning System," invented by David A Schafer, et al., U.S. application Ser. No. 08/948,450, filed on Oct. 10, 1997, now U.S. Pat. No. 6,091,795, issued on Jul. 18, 2000;

"Closed Loop Air Conditioning System for a Computed Tomography Scanner," invented by Eric Bailey, et al., U.S. application Ser. No. 08/948,692, filed on Oct. 10, 1997, now U.S. Pat. No. 5,982,843, issued on Nov. 9, 1999;

"Measurement and Control System for Controlling System Functions as a Function of Rotational Parameters of a Rotating Device," invented by Geoffrey A. Legg, et al., U.S. application Ser. No. 08/948,493, filed on Oct. 10, 1997, now U.S. Pat. No. 5,932,874, issued on Aug. 3, 1999;

"Rotary Energy Shield for Computed Tomography Scanner," invented by Andrew P. Tybinkowski, et al., U.S. application Ser. No. 08/948,698, filed on Oct. 10, 1997, now U.S. Pat. No. 5,937,028, issued on Aug. 10, 1999;

"Apparatus and Method for Detecting Sheet Objects in Computed Tomography Data," invented by Muzaffer Hiraoglu, et al., U.S. application Ser. No. 09/022,189, filed on Feb. 11, 1998, now U.S. Pat. No. 6,111,974, issued on Aug. 29, 2000;

"Apparatus and Method for Eroding Objects in Computed Tomography Data," invented by Sergey Simanovsky, et al., U.S. application Ser. No. 09/021,781, filed on Feb. 11, 1998, now U.S. Pat. No. 6,075,871, issued on Jun. 13, 2000;

"Apparatus and Method for Combining Related Objects in Computed Tomography Data," invented by Ibrahim M. Bechwati, et al., U.S. application Ser. No. 09/022,060, filed on Feb. 11, 1998, now U.S. Pat. No. 6,128,365, issued on Oct. 3, 2000;

"Apparatus and Method for Detecting Sheet Objects in Computed Tomography Data," invented by Sergey Simanovsky, et al., U.S. application Ser. No. 09/022,165, filed on Feb. 11, 1998, now U.S. Pat. No. 6,025,143, issued on Feb. 15, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Correcting Object Density in Computed Tomography Data," invented by Ibrahim M. Bechwati, et al., U.S. application Ser. No. 09/022,354, filed on Feb. 11, 1998, now U.S. Pat. No. 6,108,396, issued on Aug. 22, 2000;

"Apparatus and Method for Density Discrimination of Objects in Computed Tomography Data Using Multiple Density Ranges," invented by Sergey Simanovsky, et al., U.S. application Ser. No. 09/021,889, filed on Feb. 11, 1998, now U.S. Pat. No. 6,078,642, issued on Jun. 20, 2000;

"Apparatus and Method for Detection of Liquids in Computed Tomography Data," invented by Muzaffer Hiraoglu, et al., U.S. application Ser. No. 09/022,064, filed on Feb. 11, 1998, now U.S. Pat. No. 6,026,171, issued on Feb. 15, 2000;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Multiple-Stage Apparatus and Method for Detecting Objects in Computed Tomography Data," invented by Muzaffer Hiraoglu, et al., U.S. application Ser. No. 09/022,164, filed on Feb. 11, 1998, now U.S. Pat. No. 6,035,014, issued on Mar. 7, 2000;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998, now U.S. Pat. No. 6,067,366, issued on May 23, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Detecting Concealed Objects in Computed Tomography Data," invented by Sergey Simanovsky, et al., U.S. application Ser. No. 09/228,380, filed on Jan. 12, 1999, now U.S. Pat. No. 6,195,444, issued on Feb. 27, 2001;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Computed Tomography Apparatus and Method for Classifying Objects," invented by Sergey Simanovsky, et al., U.S. application Ser. No. 09/022,059, filed on Feb. 11, 1998, now U.S. Pat. No. 6,317,509, issued on Nov. 23, 2001;

"Apparatus and method for processing object data in computed tomography data using object projections," invented by Carl R. Crawford, et al, U.S. application Ser. No. 09/228,379, filed on Jan. 12, 1999, now U.S. Pat. No. 6,345,113, issued on Feb. 5, 2002;

"Apparatus and method for detecting concealed objects in computed tomography data," invented by Sergey Simanovsky, et al., U.S. application Ser. No. 09/228,380, filed on Jan. 12, 1999, now U.S. Pat. No. 6,195,444, issued on Feb. 27, 2001;

"Method of and system for correcting scatter in a computed tomography scanner," invented by Ibrahim M. Bechwati, et al, U.S. application Ser. No. 10/121,466, filed on Apr. 11, 2002, now U.S. Pat. No. 6,687,326, issued on Feb. 3, 2004;

"Method of and system for reducing metal artifacts in images generated by x-ray scanning devices," invented by Ram Naidu, et al, U.S. application Ser. No. 10/171,116, filed on Jun. 13, 2002, now U.S. Pat. No. 6,721,387, issued on Apr. 13, 2004;

"Method and apparatus for stabilizing the measurement of CT numbers," invented by John M. Dobbs, U.S. application Ser. No. 09/982,192, filed on Oct. 18, 2001, now U.S. Pat. No. 6,748,043, issued on Jun. 8, 2004;

"Method and apparatus for automatic image quality assessment," invented by Seemeen Karimi, et al, U.S. application Ser. No. 09/842,075, filed on Apr. 25, 2001, now U.S. Pat. No. 6,813,374, issued on Nov. 2, 2004;

"Decomposition of Multi-Energy Scan Projections using Multi-Step Fitting," invented by Ram Naidu, et al, U.S. application Ser. No. 10/611,572, filed on Jul. 1, 2003;

"Method of and system for detecting threat objects using computed tomography images," invented by Zhengrong Ying, et al, U.S. application Ser. No. 10/831,909, filed on Apr. 26, 2004;

"Method of and system for computing effective atomic number image in multi-energy computed tomography," invented by Zhengrong Ying, et al, U.S. application Ser. No. 10/850,910, filed on May 21, 2004;

"Method of and system for adaptive scatter correction in multi-energy computed tomography," invented by Zhengrong Ying, et al, U.S. application Ser. No. 10/853,942, filed on May 26, 2004;

"Method of and system for destreaking the photoelectric image in multi-energy computed tomography," invented by Zhengrong Ying, et al, U.S. application Ser. No. 10/860,984, filed on Jun. 4, 2004;

"Method of and system for extracting 3D bag images from continuously reconstructed 2D image slices in computed tomography," invented by Zhengrong Ying, et al, U.S. application Ser. No. 10/864,619, filed on Jun. 9, 2004;

"Method of and system for sharp object detection using computed tomography images," invented by Gregory L. Larson, et. al., U.S. application Ser. No. 10/883,199, filed on Jul. 1, 2004.

"Method of and system for X-ray spectral correction in multi-energy computed tomography," invented by Ram Naidu, et. al., U.S. application Ser. No. 10/899,775, filed on Jul. 17, 2004.

"Method of and system for detecting anomalies in projection images generated by computed tomography scanners," invented by Anton Deykoon, et. al., U.S. application Ser. No. 10/920,635, filed on Aug. 18, 2004.

"Method of and system for stabilizing high voltage power supply voltages in multi-energy computed tomography," invented by Ram Naidu, et. al., U.S. application Ser. No. 10/958,713, filed on Oct. 5, 2004.

FIELD OF THE DISCLOSURE

The present disclosure relates to methods of and systems for processing images generated by multi-energy computed tomography scanners, and more particularly to a method of and a system for classifying objects using multi-energy computed tomography scanners in a baggage scanning system.

BACKGROUND OF THE DISCLOSURE

Various X-ray baggage scanning systems are known for detecting the presence of explosives and other prohibited items in baggage, or luggage, prior to loading the baggage onto a commercial aircraft. A common technique of measuring a material's density is to expose the material to X-rays and to measure the amount of radiation absorbed by the material, the absorption being indicative of the density. Since many explosive materials may be characterized by a range of densities differentiable from that of other items typically found in baggage, explosives are generally amenable to detection by X-ray equipment.

Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates an X-ray beam that passes through and is partially attenuated by the baggage and is then received by the detector array. During each measuring interval the detector array generates data representative of the integral of density of the planar segment of the baggage through which the X-ray beam passes, and this data is used to form one or more raster lines of a two-dimensional image. As the conveyor belt transports the baggage past the stationary source and detector array, the scanner generates a two-dimensional image representative of the density of the baggage, as viewed by the stationary detector array. The density image is typically displayed for analysis by a human operator.

Most explosives capable of significantly damaging an aircraft are sufficiently large in length, width, and height so as to be readily detectable by an X-ray scanner system regardless of the explosive's orientation within the baggage. Plastic explosives, however, present a particular challenge to baggage scanning systems. Due to their moldable nature, plastic explosives may be formed into geometric shapes that are difficult to detect. A plastic explosive powerful enough to damage an aircraft may be formed into a relatively thin sheet that is extremely small in one dimension and is relatively large in the other two dimensions. The detection of plastic explosives may be difficult because it may be difficult to see the explosive material in the image, particularly when the material is disposed so that the thin sheet is parallel to the direction of the X-ray beam as the sheet passes through the system.

Accordingly, a great deal of effort has been made to design a better baggage scanner. Such designs, for example, have been described in U.S. Pat. No. 4,759,047 (Donges et al.); U.S. Pat. No. 4,884,289 (Glockmann et al.); U.S. Pat. No.

5,132,988 (Tsutsui et al.); U.S. Pat. No. 5,182,764 (Peschmann et al.); U.S. Pat. No. 5,247,561 (Kotowski); U.S. Pat. No. 5,319,547 (Krug et al.); U.S. Pat. No. 5,367,552 (Peschmann et al.); U.S. Pat. No. 5,490,218 (Krug et al.) and German Offenlegungsschrift DE 31 503 06 A1 (Heimann GmbH).

At least one of these designs, described in U.S. Pat. Nos. 5,182,764 (Peschmann et al.) and 5,367,552 (Peschmann et al.) (hereinafter the '764 and '552 patents), has been commercially developed and is referred to hereinafter as the "Invision Machine." The Invision Machine includes a CT scanner of the third generation type, which typically includes an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include a linear array of detectors disposed as a single row in the shape of a circular arc having a center of curvature at the focal spot of the X-ray source, i.e., the point within the X-ray source from which the X-rays emanate. The X-ray source generates a fan shaped beam, or fan beam, of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined by and lie within the planar imaging field. The fan beam is thus defined as the volume of space defined between a point source, i.e., the focal spot, and the receiving surfaces of the detectors of the detector array exposed to the X-ray beam. Because the dimension of the receiving surfaces of the linear array of detectors is relatively small in the Z-axis direction the fan beam is designed to be relatively thin in the Z-axis direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors in a single row of the detector array for any measuring interval is referred to as a "projection," or equivalently as a "view," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from an appropriate point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well-known algorithms, a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam, while the length of the detector is defined herein as the dimension measured in a direction normal to the fan beam parallel to the rotation or Z-axis of the scanner. In general, the resolution of the CT image is inversely proportional to the width of the receiving surface of each detector in the plane of the fan beam.

The CT scanner should provide images of sufficient resolution to detect plastic explosives on the order of only a few millimeters thick. Therefore, to provide adequate resolution, many revolutions are required. To meet high baggage throughput rates, a conventional CT baggage scanner such as the InVision Machine can only afford to generate a few CT images per bag. Clearly, one cannot scan the entire bag within the time allotted for a reasonably fast throughput. Generating only a few CT images per baggage items leaves most of the item unscanned and therefore does not provide scanning adequate to identify all potential threat objects in the bag, such as sheets of explosive material.

To improve throughput, the InVision Machine uses a pre-screening process which produces a two-dimensional projection image of the entire bag from a single angle. Regions of the projection identified as potentially containing threat items can then be subjected to a full scan or manual inspection. With this pre-screening and selective region scanning approach, the entire bag is not scanned, thus allowing potential threat items to pass through undetected. This is especially true in the case of sheet items oriented transversely to the direction of propagation of the radiation used to form the pre-screen projection and where the sheet covers a relatively large portion of the area of the bag.

Another baggage scanning system is described in an International Patent Application under the Patent Cooperation Treaty, document number WO 96/13017, published on May 2, 1996, entitled, "X-Ray Computed Tomography (CT) System for Detecting Thin Objects," invented by Eberhard, et al. (referred to herein as the "Eberhard et al. system"). In the Eberhard, et al. system, an entire bag is subjected to a CT scan to generate voxel density data for the bag. A connected components labeling (CCL) process is then applied to the entire bag to identify objects by grouping voxels which are physically close together and which have densities within a predetermined range of densities. The voxels in each object are then counted to determine the volume of each object. If the volume of an object exceeds a threshold, the mass of the object is computed by multiplying the volume of each object voxel by its density and then totaling the individual voxel masses. If the mass of an object exceeds a mass threshold, the object is concluded to be a threat.

The Eberhard et al. publication teaches that its system can identify thin objects. The system sets its labeling density at a low level such that thin objects viewed edge-on which partially fill a voxel can be detected.

A significant drawback to the Eberhard et al. system is that it may miss thin objects such as sheet explosives that are not viewed edge-on and which cover a large area of the bag. These transversely oriented sheet objects will add only slightly to the density measured for the bag and will have only small density contrast with the background. If the density threshold used during CCL is set low enough to detect these sheets, then, because of the low contrast between the sheet and the background, the entire bag will be connected and labeled together, and no discernable object will be identified. If the threshold is set higher, then the sheet object will be missed.

Referring to the drawings, FIGS. 1, 2 and 3 show perspective, end cross-sectional and radial cross-sectional views, respectively, of a typical baggage scanning system 100, which includes a conveyor system 110 for continuously conveying baggage or luggage 112 in a direction indicated by arrow 114 through a central aperture of a CT scanning system 120. The conveyor system includes motor driven belts for supporting the baggage. Conveyer system 110 is illustrated as including a plurality of individual conveyor sections 122; however, other forms of conveyor systems may be used.

The CT scanning system 120 includes an annular shaped rotating platform, or disk, 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the present assignee and, which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 is preferably a two-dimensional array, such as the array described in U.S. Pat. No. 6,091,795 entitled, "Area Detector Array for Computed Tomography Scanning System." Other suitable arrays are known in the prior art. The system 120 further includes a data acquisition system (DAS) 134 for receiving and processing signals generated by detector array 130, and an X-ray tube control system 136 for supplying power to, and otherwise controlling the operation of, X-ray tube 128. The system 120 is also preferably provided with a computerized system (not shown) for processing the output of the data acquisition system 134 and for generating the necessary signals for operating and controlling the system 120. The computerized system can also include a monitor for displaying information including generated images. System 120 also includes shields 138, which may be fabricated from lead, for example, for preventing radiation from propagating beyond gantry 125.

The X-ray tube 128 may generate a pyramidally shaped beam, often referred to as a "cone beam," 132 of X-rays that pass through a three dimensional imaging field, through which conveying system 110 transports baggage 112. After passing through the baggage disposed in the imaging field, detector array 130 receives cone beam 132 and generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the conveyor system 110 continuously transports baggage through central aperture 126, so as to generate a plurality of projections at a corresponding plurality of projection angles.

Techniques using dual energy X-ray sources are known for providing additional information about a material's characteristics, beyond solely a density measurement. Techniques using dual energy X-ray sources involve measuring the X-ray absorption characteristics of a material for two different energy levels of X-rays. Depending upon the calibration of the scanner, dual energy measurements provide an indication of dual parameters of the material being scanned. For example, at one calibration setting, the dual parameters can be chosen to be the material's effective atomic number (Z is denoted as "effective atomic number") and the material's density. At another calibration setting, the dual parameters can be chosen to be the material's photoelectric coefficients and the material's Compton coefficients. At yet another calibration setting, the dual parameters can be chosen to be an amount of a first material present (e.g., plastic) and an amount of a second material present (e.g., aluminum). Dual energy X-ray techniques for energy-selective reconstruction of X-ray Computer Tomography (hereinafter referred to as CT) images are described, for example, in Robert E. Alvarez and Albert Macovski, "Energy-selective Reconstructions in X-ray Computerized Tomography," Phys. Med. Biol. 1976, Vol. 21, No. 5, 733-744; and U.S. Pat. Nos. 4,029,963 and 5,132,998. One algorithm used to generate such dual parameters from dual energy X-ray projection data is known as the Alvarez/Macovski Algorithm (hereinafter referred to as AMA). Others are known in the art.

One proposed use for such dual energy techniques has been in connection with a baggage scanner for detecting the presence of explosives in baggage. Explosive materials are generally characterized by a known range of atomic numbers and are therefore amenable to detection by such dual energy X-ray sources. One such dual energy source is described in U.S. Pat. No. 5,661,774, entitled "Improved Dual Energy Power Supply," assigned to the present assignee and incorporated herein by reference. When dual energy scanning mode is configured for the system as depicted in FIGS. 1, 2 and 3, the control system 136 supplies modulated high voltages with respect to alternating projection angles to the X-ray tube 128. The detector array 130 then receives data corresponding to high-energy and low-energy X-ray spectra in alternating projection angles. Other dual energy sources are known in the art.

Post-reconstruction analysis and pre-reconstruction analysis are the two prior art techniques generally recognized for using dual energy X-ray sources in materials analysis (e.g., in a baggage scanner for detecting the presence of explosives in baggage). In post-reconstruction analysis, the signal flow is as shown in FIG. 4. The scanner 120 is typically similar to the one shown in FIGS. 1-3 and has an X-ray source capable of producing a fan or cone beam at two distinct energy levels (i.e., dual energy). The DAS 134 gathers signals generated by detector array 130 at discrete angular positions of the rotating platform 124, and passes the signals to the pre-processing unit 206. The pre-processing unit 206 re-sorts the data it receives from the DAS 134 in order to optimize the sequence for the subsequent mathematical processing. The pre-processing unit 206 also corrects the data from the DAS 134 for detector temperature, intensity of the primary beam, gain and offset, and other deterministic errors. Finally, the pre-processing unit 206 extracts data corresponding to high-energy views and routes it to a high-energy path 208, and routes the data corresponding to low-energy views to a low-energy path 210. A first reconstruction computer 218 receives the projection data from the high-energy path 208 and generates a CT image $I_H$ 226 corresponding to the high-energy series of projections. A second reconstruction computer 220 receives the projection data from the low-energy path 210 and generates a CT image $I_L$ 224 corresponding to the low-energy series of projections. A post-processing unit 230 receives the high-energy CT image 226 and the low-energy CT image 224 and performs voxel-by-voxel processing to yield the effective atomic number (Z is denoted as effective atomic number) image $I_z$ 232. The Z image 232 and the high-energy CT image 226 can be provided to operators on a display 240, and both images can be used for automatic explosive detection in 238 as well. The images from the post-reconstruction analysis usually do not yield accurate estimates of the material's effective atomic number, and suffer low SNR (Signal to Noise Ratio) and many artifacts as well.

In pre-reconstruction analysis, the signal flow is as shown in FIG. 5. As is described herein for pre-reconstruction analysis, the dual energy decomposition computer 212 receives the projection data on the high-energy path 208 and the low-energy path 210 and performs the Alvarez/Macovski Algorithm to produce a first stream of projection data $A_c$ 214, which is dependent on a first parameter of the material being scanned, and a second stream of projection data $A_p$ 216, which is dependent on a second parameter of the material scanned. The first material parameter is often the Compton coefficient $a_c$, and the second material parameter is often the photoelectric coefficient $a_p$. A first reconstruction computer 219 receives the first stream of projection data 214 and generates a Compton image $I_c$ 227 from the series of projections corresponding to the first material parameter. A second reconstruction computer 221 receives the second stream of projection data 216 and generates a photoelectric image $I_p$ 225 from the series projections corresponding to the second material parameter. The third reconstruction computer 218 receives the stream of projection data 208 and generates a high-energy CT image $I_H$ 226. The two images 225 and 227 are processed in the post-processing unit 230 to yield a Z image $I_z$ 232. The High-energy CT image 226 and the Z image 232 can be provided to operators on a display 240, and both images can be used for automatic explosive detection in detection unit 238 as well. The pre-reconstruction analysis yields better estimates of material's effective atomic number than the post-reconstruction analysis. However the pre-reconstruction analysis requires one more reconstruction computer than the post-reconstruction analysis.

Various approaches have been used for decomposition of the input projection data $P_L$ and $P_H$ into Compton projections $A_c$ and photoelectric projections $A_p$. For example, the AMA method approximates $P_L$ and $P_H$ using polynomial functions in terms of $A_c$ and $A_p$. The coefficients of the polynomial functions are determined through a calibration procedure as follows. By measuring the projection values of the combination of various thicknesses of two known materials, the coefficients can be calculated through a polynomial least squares fitting between the measured and modeled $P_L$ and $P_H$. Once the coefficients of the polynomial functions are determined, the decomposition of the Compton and Photoelectric projections $A_c$ and $A_p$ from projections $P_L$ and $P_H$ is usually solved using the Newton-Raphson method.

Another prior art method of performing decomposition is the direct approximation method, discussed in L. A. Lehmann, R. E. Alvarez, A. Macovski, W. R. Brody, N. J. Pelc, S. J. Riederer, and A. L. Hall, *Generalized Image Combinations In Dual KVP Digital Radiography*, Med. Phys. 8, 659-667 (1981). In the direct approximation method, $A_c$ and $A_p$ are approximated as polynomial functions in terms of $P_L$ and $P_H$. The coefficients of the polynomial functions in the direct approximation method are determined through a calibration procedure by measuring the projection values of the combination of various thicknesses of two known materials.

In yet another prior art method, decomposition is accomplished using iso-transmission lines, described K. Chuang and H. K. Huang, *A Fast Dual-Energy Computational Method Using Isotransmission Lines and Tables*, Med. Phys. 14, 186-192 (1987). According to this method, for a given projection value, an isotransmission line is represented by a linear equation in two basis functions. The isotransmission line method requires a large amount of calibration data. Further, the isotransmission line becomes increasingly non-linear as the projection value increases. In such a situation, the linear equations are not valid and the method causes large approximation errors.

CT images and Z (effective atomic number) images can be generated from both the pre-reconstruction and post-reconstruction analysis. The CT images measure the CT number of scanned materials, which approximates the density of the materials within a voxel; and the Z image measures the effective atomic number of the scanned materials within each voxel. The measurements of both CT number and Z can be used for automatic explosive detection.

In the assignee's single energy CT baggage scanning system as described and claimed in the U.S. patent applications listed above and incorporated herein by reference, single energy CT images without atomic number (Z) images are used to identify and classify threat items such as explosives by analyzing mass and/or density of identified objects in general. Voxels in CT data for a piece of baggage are associated with density values. Voxels, having density values within certain predetermined ranges, can be identified and grouped together as objects. After objects are thus identified, a discrimination approach is applied in which identified objects can be classified as to whether they pose a threat. Using voxel volumes and masses of identified objects are compared to predetermined mass thresholds. Analysis of this comparison and other predetermined discrimination parameters, such as mean and standard deviation of the density, is used to determine whether the identified object can be classified as a threat object.

With the dual energy CT scanner producing both the CT image and the Z image, it is beneficial to have the detection system to use both types of images for threat detection to reduce false alarm rate, thus lowering the labor cost for checked luggage screening.

CT scanners are not perfect imaging devices, and there is a partial volume effect on density images; that is, the density value resented in the CT image is much lower than the physical density of a thin object, such as a steel bowl and a thermos bottle. Due to this partial volume effect, when the voxels represented by different objects are attached to each other in a thinly connected fashion, segmentation algorithms usually can not separate these objects apart, resulting in one segmented object containing multiple physical objects. The unsuccessful segmentation result degrades the performance for object detection. Thus, it is desirable to split such an under-segmented object into multiple component objects to improve the explosive detection performance of a scanner.

SUMMARY OF THE DISCLOSURE

The present disclosure is directed to an object identification method and a computed tomography (CT) baggage screening system which use the object identification method of the present disclosure. The object identification method of the disclosure analyzes acquired CT density data and Z (atomic number) data for a region to detect objects in the data.

In one embodiment of the present disclosure, segmentation is performed to segment the scanned 3D region into objects. At least two segmentation paths including a sheet path and a bulk path for detecting different types of objects are provided. The segmentation results are stored in a 3D label image.

In accordance with one aspect of the present disclosure, compound object detection is performed on each segmented object. The compound object detection computes and uses the standard deviation of objects' density and atomic number measurements for detection. When a compound object is detected, compound object splitting is performed to segment the compound object into different component objects to improve the discrimination accuracy.

In one embodiment of the present disclosure, the compound object splitting comprises: computing a two-dimensional DZ distribution of the compound object; identifying clusters within the DZ distribution; assigning each object voxel with a component label based on the DZ distribution clusters; and post-processing the set of voxels identified as belonging to each component.

In one embodiment of the present disclosure, a two-dimensional DZ distribution of each compound object is computed. The computed DZ distribution is then smoothed out to remove small local maxima and local minima. The smoothing operation uses an exponential smoothing kernel. Other kernels may be used.

According to one aspect of the present disclosure, a modified version of a mean shift method is used for clustering the DZ distribution. The modification includes applying an attenuation function to the mean shift step size to decrease the magnitude of a large shift and to increase the magnitude of a small shift to yield more stable convergence. In an alternative embodiment, the attenuation function includes a logarithmic function. Other functions may be used.

In one embodiment of the present disclosure, a connectivity matrix is computed with each entry indicating the degree of the connectivity between two clusters in the DZ distribution. Two clusters that have a high connectivity value are merged into one cluster. In an alternative embodiment, clusters in the DZ distribution with small area are removed.

In one embodiment of the present disclosure, the clustering of the compound object in a DZ distribution is associated with object labels in the 3D label image. Each cluster in the DZ distribution corresponds to a component object of the compound object in the 3D label image. A 3D connectivity matrix of the component objects is also computed to merge two clusters in the DZ distribution when they are highly connected in 3D space.

In accordance with one aspect of the present disclosure, a post-processing method including multiple rounds of erosions on the component objects is also performed to remove thinly stretched parts of component objects split from a compound object.

A system for splitting a compound object is also disclosed. The system includes modules configured to implement the above functionality. The system may include a compound object detection module; a module for computing a DZ distribution of the compound object; a module for identifying clusters within the computed DZ distribution; a module for merging clusters using connectivity matrix of the DZ distribution; a module for removing clusters with small areas in DZ distribution space; a module for merging clusters using connectivity matrix of the 3D component objects; a module for assigning component labels using the identified DZ distribution clusters; and a post-processing module for eroding the component objects.

While this disclosure has been particularly shown and described with references to preferred embodiments thereof, it will be understood by those skilled in the art that various changes in form and details may be made therein without departing from the spirit and scope of the disclosure as defined by the following claims.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

Figure 1:
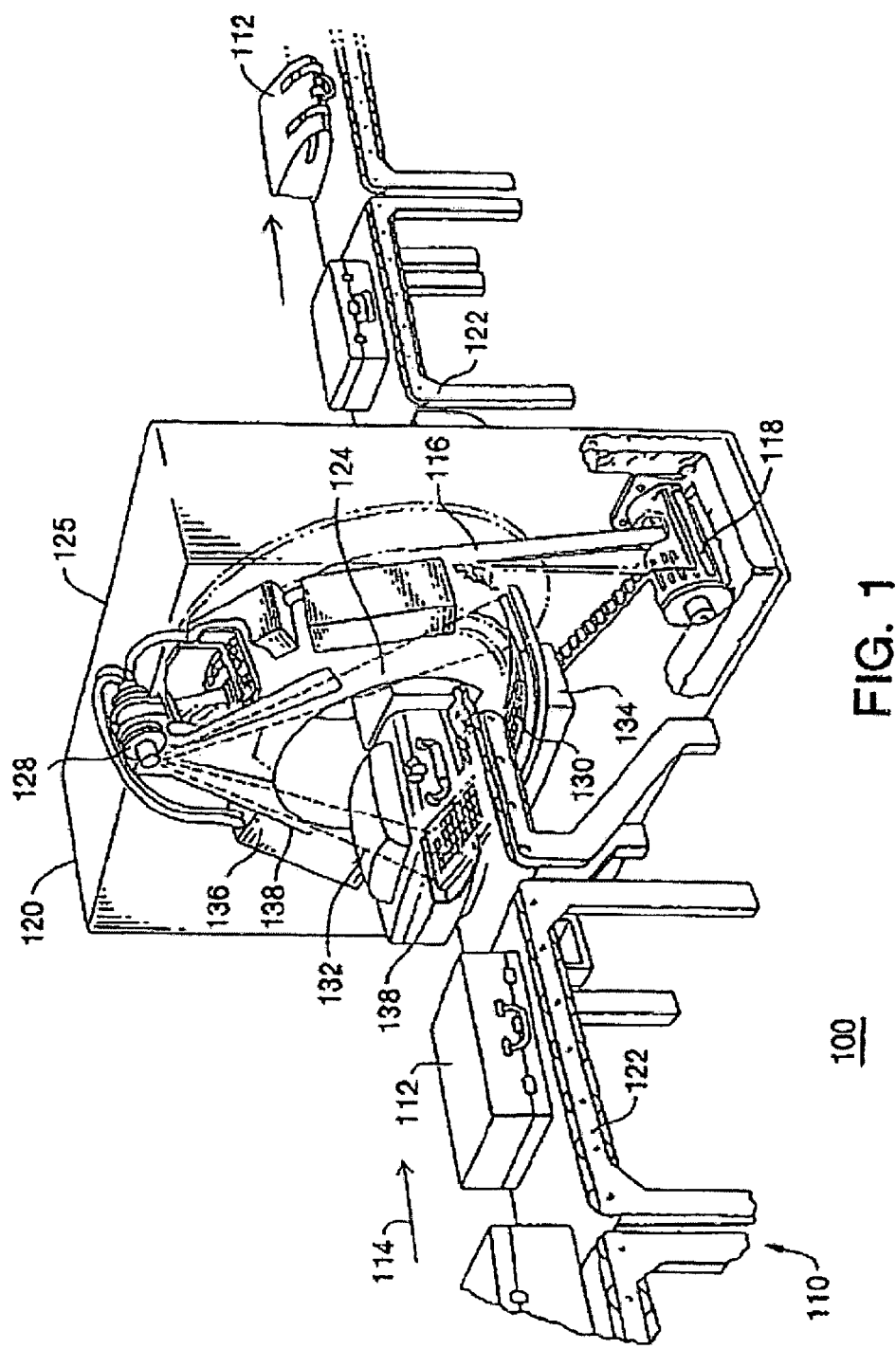
FIG. 1 is a perspective view of a baggage scanning system, known in the prior art.
Figure 2:
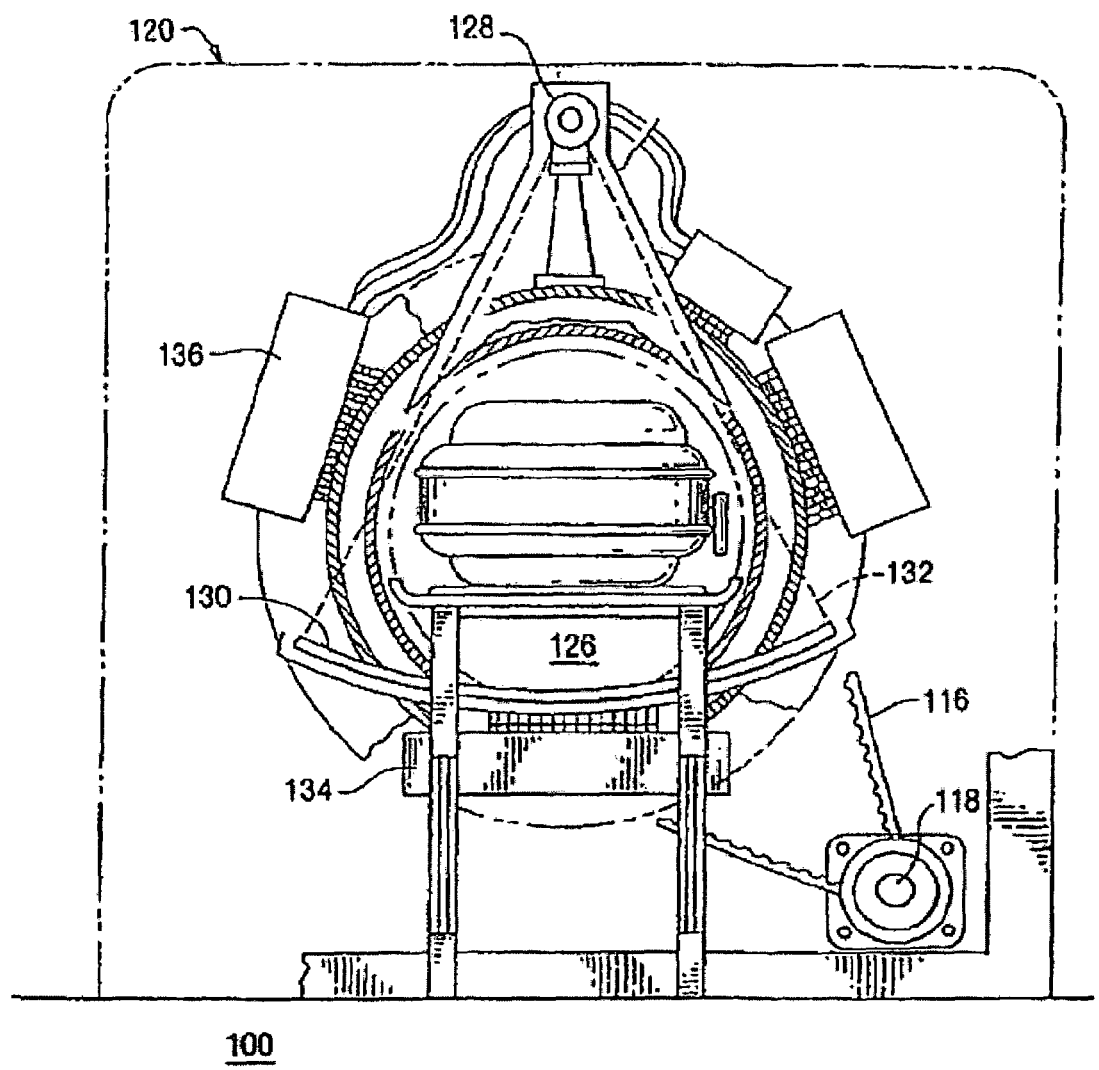
FIG. 2 is a cross-sectional end view of the system of FIG. 1.
Figure 3:
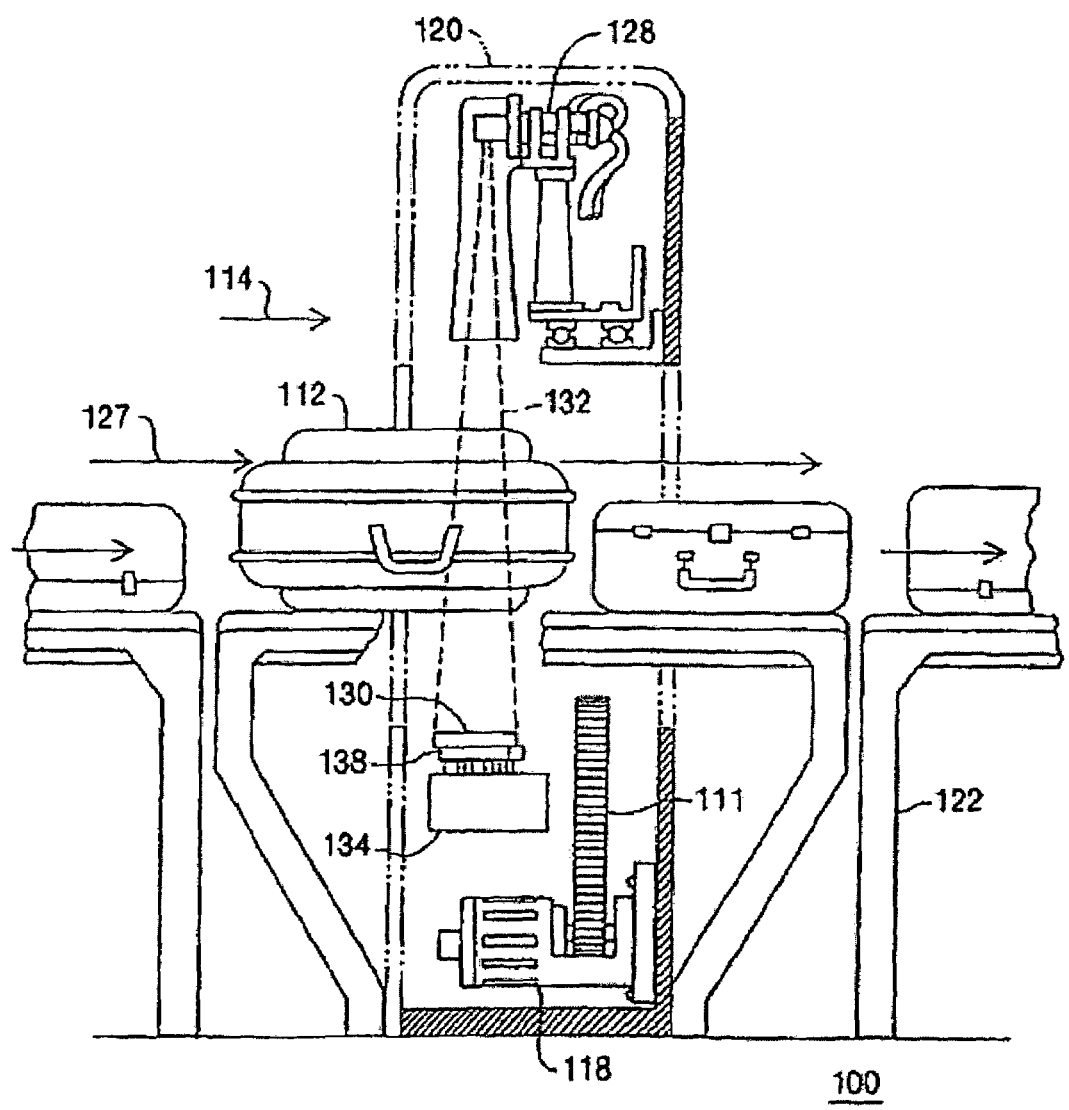
FIG. 3 is a cross-sectional radial view of the system of FIG. 1.
Figure 4:
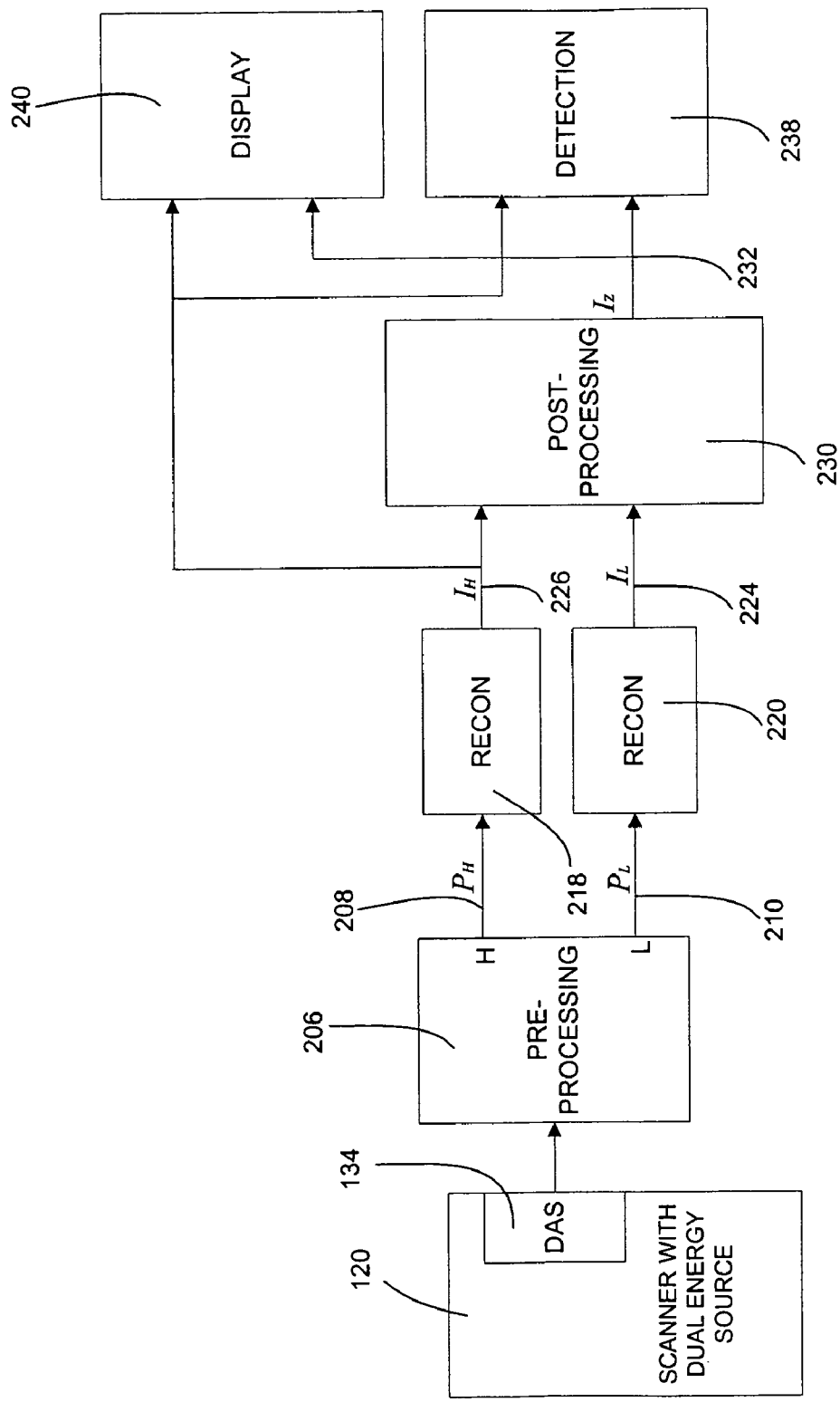
FIG. 4 is a signal flow diagram of a prior art system capable of performing post-reconstruction analysis, useful in the system of FIG. 1.
Figure 5:
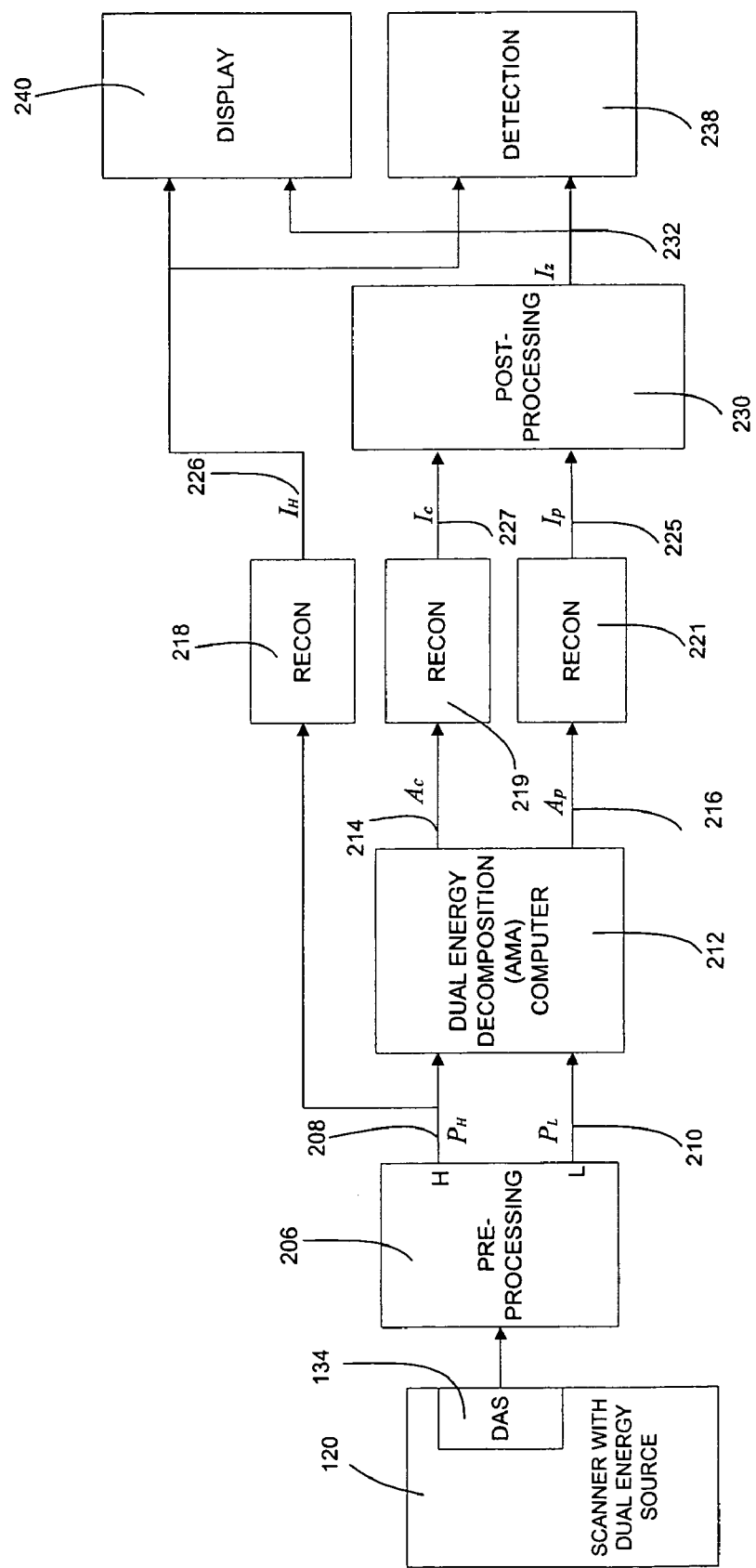
FIG. 5 is a signal flow diagram of a prior art system capable of performing pre-reconstruction analysis, useful in the system of FIG. 1.

The present disclosure provides a system and a method which detect, identify and/or classify objects in multi-energy CT data including a CT image, which approximates the density measurements of the scanned objects, and a Z (effective atomic number) image, which approximates the atomic number measurements of scanned objects. The disclosure can therefore be implemented in a CT baggage scanning system. The objects identified by the disclosure can be objects known to pose threats to persons at an airport or on board an aircraft. These objects can include explosive objects and materials.

The generation of the CT image and Z image from a dual energy CT scanner uses methods described in the assignee's "Method of and system for adaptive scatter correction in multi-energy computed tomography" by Zhengrong Ying, et al. U.S. application Ser. No. 10,853,942, filed on May 26, 2004; incorporated herein by reference; "Method of and system for destreaking the photoelectric image in multi-energy computed tomography" by Zhengrong Ying, et. al. U.S. application Ser. No. 10/860,984, filed on Jun. 4, 2004; incorporated herein by reference; "Decomposition of Multi-Energy Scan Projections using Multi-Step Fitting" by Naidu, et. al. U.S. application Ser. No. 10/611,572, filed on Jul. 1, 2003, incorporated herein by reference; "Method of and system for computing effective atomic number image in multi-energy computed tomography" by Zhengrong Ying, et. al. U.S. application Ser. No. 10/850,910, filed on May 21, 2004, incorporated herein by reference; and "Method of and system for X-ray spectral correction in multi-energy computed tomography," invented by Ram Naidu, et. Al. U.S. application Ser. No. 10/899,775, filed on Jul. 27, 2004, incorporated herein by reference.

NSR (as described in U.S. Pat. No. 5,802,134, incorporated herein its entirety by reference) reconstruction of the dual energy images not only generates a 3D CT image and a 3D Z image for each piece of scanned luggage, but also generates at least two 2D projection images. The 2D projections images are similar to the projection images obtained from line-projection scanners. In one embodiment of the present disclosure, these 2D projection images are used to detect shield objects.

Throughout this application, the term "3-D CT image" and the symbol C(i,j,k) are used to represent a set of CT slice images. The size of each CT slice is I columns by J rows. The symbol i in C(i,j,k) represents the column index and runs from 0 to I−1. Similarly, the symbol j represents the row index and runs from 0 to J−1. There are K of these slices in a set. The symbol k represents one of these slices and runs from 0 to K−1. The function C(i,j,k) is used to refer to or represent a particular CT density in this set, meaning that it is the CT density value at the $i^{th}$ column and the $j^{th}$ row of the $k^{th}$ slice. The CT densities are represented by nonnegative integers with 0 (Hounsfield units) corresponding to the density of air and 1000 (Hounsfield units) corresponding to the density of water, although if desired other integer values can be used.

Similarly, throughout this application, the term "3-D Z image" and the symbol Z(i,j,k) are used to represent a set of Z slice images. The size of a Z image is the same as the CT image, that is, I columns by J rows by K slices. The function Z(i,j,k) is used to refer to or represent a particular atomic number in this set, meaning that it is the atomic number value multiplied by 100 at the $i^{th}$ column and the $j^{th}$ row of the $k^{th}$ slice. For example, Aluminum has atomic number value of 13, and it is 1300 in the Z image.

Figure 6:
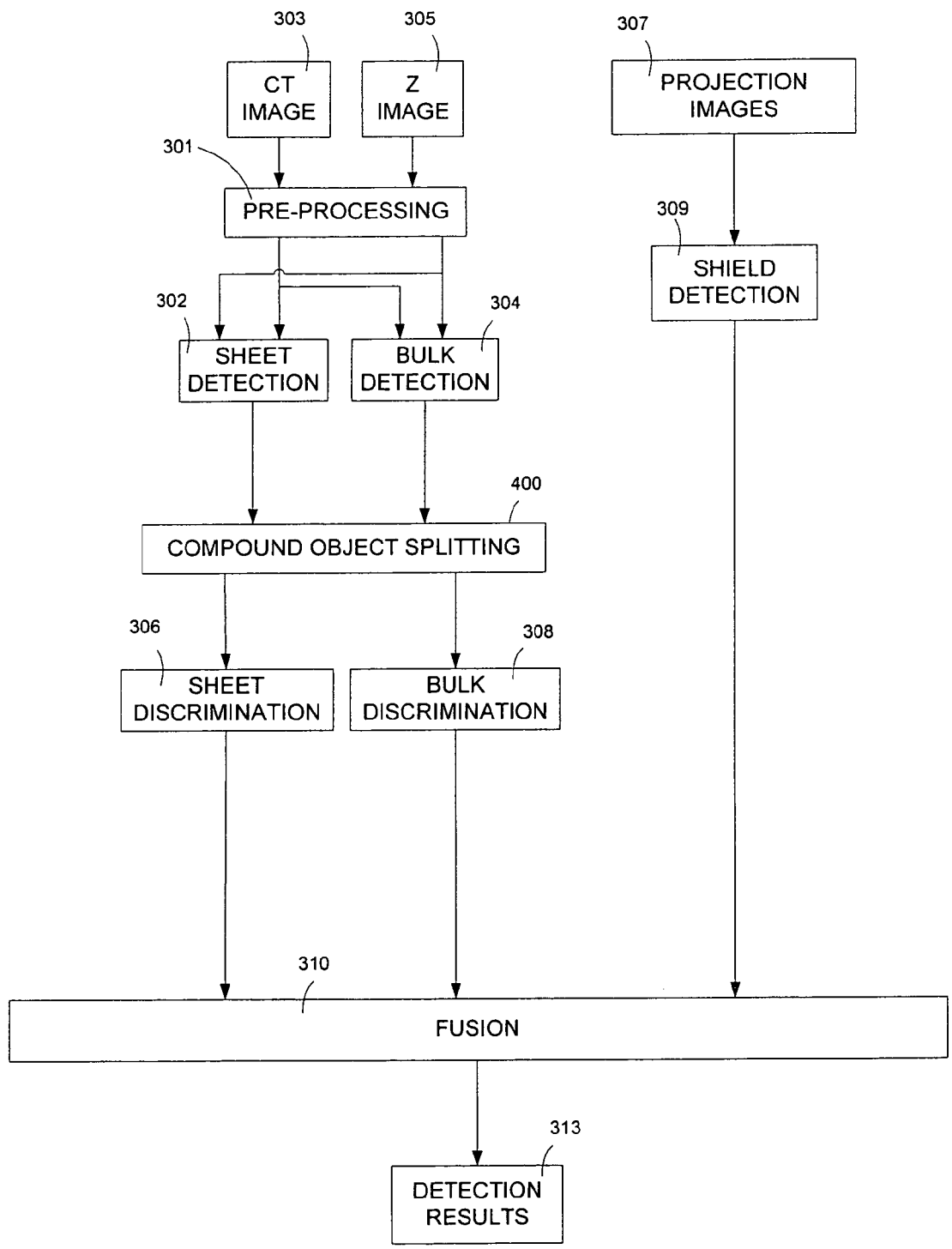
FIG. 6 contains a flow diagram of the logical flow of one embodiment of the object identification method of the present disclosure.

FIG. 6 contains a top-level flow diagram which illustrates the logical flow of one embodiment of the object identification method of the disclosure. In one embodiment, in a first step 301, reconstructed CT image data 303 and Z image data 305 are received and pre-processed. The preprocessing includes finding a Region Of Interest (ROI) from the CT image, and applying the ROI to the Z image. The preprocessing also includes an erosion operation to disconnect thinly connected objects. The methods of finding the ROI and performing the erosion operation are described in the present assignee's patents: U.S. Pat. Nos. 6,076,400, 6,195,444, 6,272,230, 6,317,509, incorporated herein by reference and referred to hereinafter as the "Assignee's Patents".

Along the sheet detection path, sheet-shaped objects are detected in the sheet detection step 302. The sheet detection preferably uses Constant False Alarm Rate (CFAR) and Connected Component Labeling (CCL) methods, which are described in the Assignee's Patents, to segment sheet objects from the CT image. The outputs of sheet explosive detection include a label image for sheet explosives $L_s(i,j,k)$ (same size as C(i,j,k)), the number of detected sheet explosives $N_s$. Each sheet object $l=1, \ldots N_s$ is defined by a plurality of voxels in $L_s(i,j,k)$ with the label number l.

In the compound object splitting step 400 of FIG. 6, a compound object may be split into different objects for discrimination. The details of this step will be described later.

In the sheet discrimination step 306 of FIG. 6, detected objects are preferably analyzed to determine if they are threats. The mean density $\rho_l^{sheet}$, the standard deviation of the density $\sigma_l^{\rho sheet}$, the mass $m_l^{sheet}$, the mean atomic number $Z_l^{sheet}$ and the standard deviation of the atomic number $\sigma_l^{Zsheet}$ for each sheet object $l=1, \ldots N_s$ are preferably computed for discrimination in accordance with the defined relationships., $$\rho_l^{sheet} = \frac{1}{N_l} \sum_{L_s(i,j,k)=l} C(i,j,k)$$

$$\sigma_l^{\rho sheet} = \sqrt{\frac{1}{N_l} \sum_{L_s(i,j,k)=l} (C(i,j,k) - \rho_l^{sheet})^2}$$

$$Z_l^{sheet} = \frac{1}{N_l} \sum_{L_s(i,j,k)=l} Z(i,j,k)$$

$$\sigma_l^{Zsheet} = \sqrt{\frac{1}{N_l} \sum_{L_s(i,j,k)=l} (Z(i,j,k) - Z_l^{sheet})^2}$$

where $N_l$ is the number voxels for sheet object $l=1, \ldots N_s$.

For each sheet object in the embodiment described, the decision is made whether this sheet object is a potential threat based on the object mass, the mean and standard deviation of the density and the atomic number. In the preferred embodiment, the sheet object is a threat if all of the following conditions are met:

Mass $m_l^{sheet}$ is greater than a threshold $M_{sheet}$

Mean density $\rho_l^{sheet}$ is within a range $(\rho_{sheet}^{min}, \rho_{sheet}^{max})$ Standard deviation of the density $\sigma_l^{\rho sheet}$ within a range $(\sigma_{sheet}^{\rho\,min}, \sigma_{sheet}^{\rho\,max})$ Mean atomic number $Z_l^{sheet}$ is within a range $(Z_{sheet}^{min}, Z_{sheet}^{max})$ Standard deviation of the atomic number $\sigma_l^{Zsheet}$ within a range $(\sigma_{sheet}^{Z\,min}, \sigma_{sheet}^{Z\,max})$ The parameters $M_{sheet}$, $(\rho_{sheet}^{min}, \rho_{sheet}^{max})$, $(\sigma_{sheet}^{\rho\,min}, \sigma_{sheet}^{\rho\,max})$, $(Z_{sheet}^{min}, Z_{sheet}^{max})$, $(\sigma_{sheet}^{Z\,min}, \sigma_{sheet}^{Z\,max})$ are preferably empirically or experimentally determined to yield certain detection performance including the probability of detection and probability of false alarm. These parameters can also be dependent on the specific type of explosive, and can also be dependent of the mass of explosive, such as the method described in "Apparatus and method for classifying objects in computed tomography data using density dependent mass thresholds," invented by Ibrahim M. Bechwati, et. al. U.S. Pat. No. 6,076,400, issued on Jun. 20, 2000, incorporated herein by reference, and assigned to the present assignee.

The bulk object detection process of the disclosure preferably searches the bag image for clusters of voxels in the density range of interest, can label them as bulk objects, and can use mass, density, atomic number, and other statistics as features to determine if an object is a threat.

Along the bulk detection path, bulk-type objects are detected in the bulk detection step 304. The bulk detection preferably includes performing CCL, pruning, dilation, partial volume correction, object merging, which are described in the Assignee's Patents, to segment the CT image into objects. The outputs of bulk detection may include a label image for bulk explosives $L_b(i,j,k)$ (same size as C(i,j,k)), the number of detected bulk explosives $N_b$, the eroded mean density $\sigma_l^{\rho bulk}$, the standard deviation of the eroded density $\sigma_l^{\rho bulk}$, and the partial volume corrected mass $m_l^{bulk}$. Each bulk object $l=1, \ldots N_b$ is defined by a plurality of voxels in $L_b(i,j,k)$ with the label number l.

In the compound object splitting step 400 of FIG. 6, a compound object may be split into different component objects for discrimination. The details of this step will be described later.

In the bulk discrimination step 308 of FIG. 6, detected objects are analyzed to determine if they are potential threats. The mean atomic number $Z_l^{bulk}$ and the standard deviation of the atomic number $\sigma_l^{Zbulk}$ for each bulk object $l=1, \ldots N_b$ are also preferably computed for the initial discrimination, $$Z_l^{bulk} = \frac{1}{N_l} \sum_{L_b(i,j,k)=l} Z(i,j,k)$$

$$\sigma_l^{Zbulk} = \sqrt{\frac{1}{N_l} \sum_{L_b(i,j,k)=l} (Z(i,j,k) - Z_l^{bulk})^2}$$

where $N_l$ is the number voxels for bulk object $l=1, \ldots N_b$.

For each bulk object, the decision is made whether this bulk object is a potential threat preferably based on the object mass, the mean and standard deviation of the density and the atomic number. The bulk object is preferably determined to be a potential threat if all of the followings are met:

Mass $M_l^{bulk}$ is greater than a threshold $M_{bulk}$

Mean eroded density $\rho_l^{bulk}$ is within a range ($\rho_{bulk}^{min}$, $\rho_{bulk}^{max}$)

Standard deviation of the eroded density $\sigma_l^{\rho bulk}$ within a range ($\sigma_{bulk}^{\rho\,min}$, $\sigma_{bulk}^{\rho\,max}$)

Mean atomic number $Z_l^{bulk}$ is within a range ($Z_{bulk}^{min}$, $Z_{bulk}^{max}$)

Standard deviation of the atomic number $\sigma_l^{Zbulk}$ within a range ($\sigma_{bulk}^{Z\,min}$, $\sigma_{bulk}^{Z\,max}$)

The parameters $M_{bulk}$, ($\rho_{bulk}^{min}$,$\rho_{bulk}^{max}$), ($\sigma_{bulk}^{\rho\,min}$, $\sigma_{bulk}^{\rho\,max}$), ($Z_{bulk}^{min}$,$Z_{bulk}^{max}$), ($\sigma_{bulk}^{Z\,min}$,$\sigma_{bulk}^{Z\,max}$) are empirically or experimentally determined to yield certain detection performance including the probability of detection and probability of false alarm. These parameters can also be dependent on a specific type or types of explosive, and can also be dependent of the mass of explosive, such as the method described in "Apparatus and method for classifying objects in computed tomography data using density dependent mass thresholds," invented by Ibrahim M. Bechwati, et. al. U.S. Pat. No. 6,076,400, issued on Jun. 20, 2000, incorporated herein by reference, and assigned to the present assignee.

The shield detection process step 309 of FIG. 6 preferably searches the projection images for clusters of pixels in the density range of interest, and can label them as shield objects. Projection images are 2D images as indicated at step 307. Each pixel represents the integral of the object x-ray attenuation along the beam path.

Figure 7:
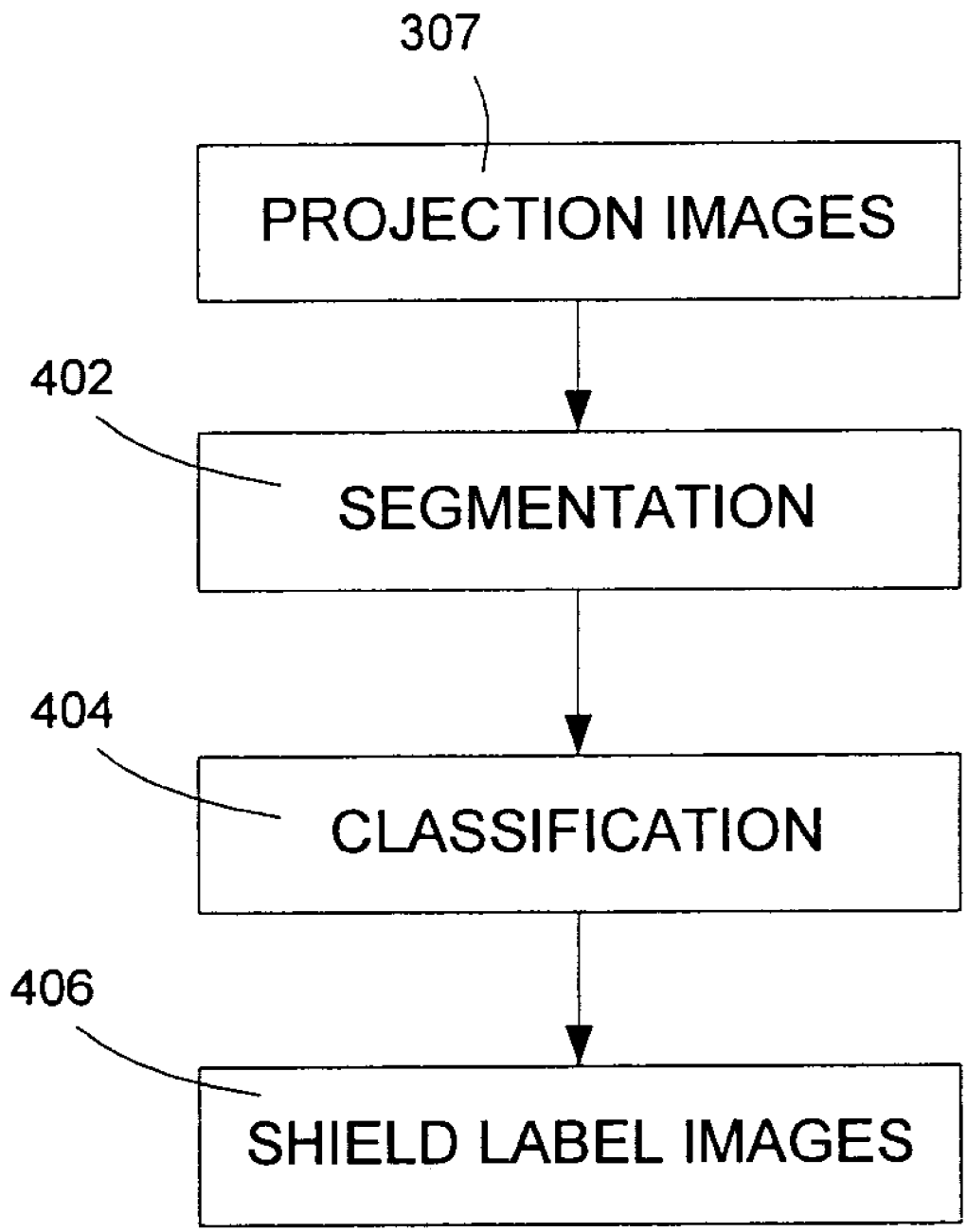
FIG. 7 contains a flow diagram of the logical flow of one embodiment of a shield detection method in accordance with the present disclosure.

FIG. 7 is a schematic flow diagram which illustrates the logical flow of one embodiment of the shield detection method of the disclosure. The inputs to the shield detection method include 2D projection images at step 307. In one particular embodiment of the present disclosure, two projection images, of which the projection angles are 90 degrees apart, are used. Let $P_0(i,j)$ be the first projection image, and $P_1(i,j)$ be the second projection image. The size of both projection images is of I×J pixels.

The segmentation step 402 uses 2D CCL, as described in A. Rosenfeld and J. L Pfaltz, "Sequential operations in digital processing," JACM, vol. 13, pp. 471-494, 1966, to segment each of the projection images in the interested attenuation range for shield detection. The resulting label images are denoted as $L_{P0}(i,j)$ and $L_{P1}(i,j)$.

In Step 404 in connection to FIG. 7, the mean attenuation μl and the number of pixels A for each segmented object are preferably computed for classification. A shield is preferably classified if both the mean attenuation μl is greater than an attenuation threshold, and the number of pixels A is greater than an area threshold. The thresholds are chosen with lots of analysis of numerous scanned data sets. The result of the classification step 404 are shield label images, as denoted at 406.

Given the bulk, sheet, and shield detection results, the last step, as illustrated in FIG. 6 step 310, is fusing these results into desired format for operators to interpret at step 313 of FIG. 6.

In one embodiment, the fusion between the bulk label image $L_b(i,j,k)$ and sheet label image $L_s(i,j,k)$ can preferably be performed to yield an output label image $L(i,j,k)$ as follows.

$$L(i,j,k) = L_s(i,j,k)N_b + L_b(i,j,k)$$

where $N_b$ is the number of bulk threats. The output label is essentially a two-dimensional array with a sheet label as a row index and a bulk label as a column index. This allows the voxels occupied by both a bulk threat and a sheet threat to preferably be provided as an output for displaying.

The details of the compound object splitting step 400 of FIG. 6 are now described below. CT scanners are not perfect imaging devices, and there is a partial volume effect on density images; that is, the density value from the CT image is much lower than the physical density of a thin object, such as a steel bowl or a thermos bottle. When objects with different density values are attached to each other in a thinly connected fashion, the partial volume effect results in a smooth transition of the density values among connected objects with different densities. Such a smooth transition usually causes segmentation algorithms failing to separate them apart.

Figure 8:
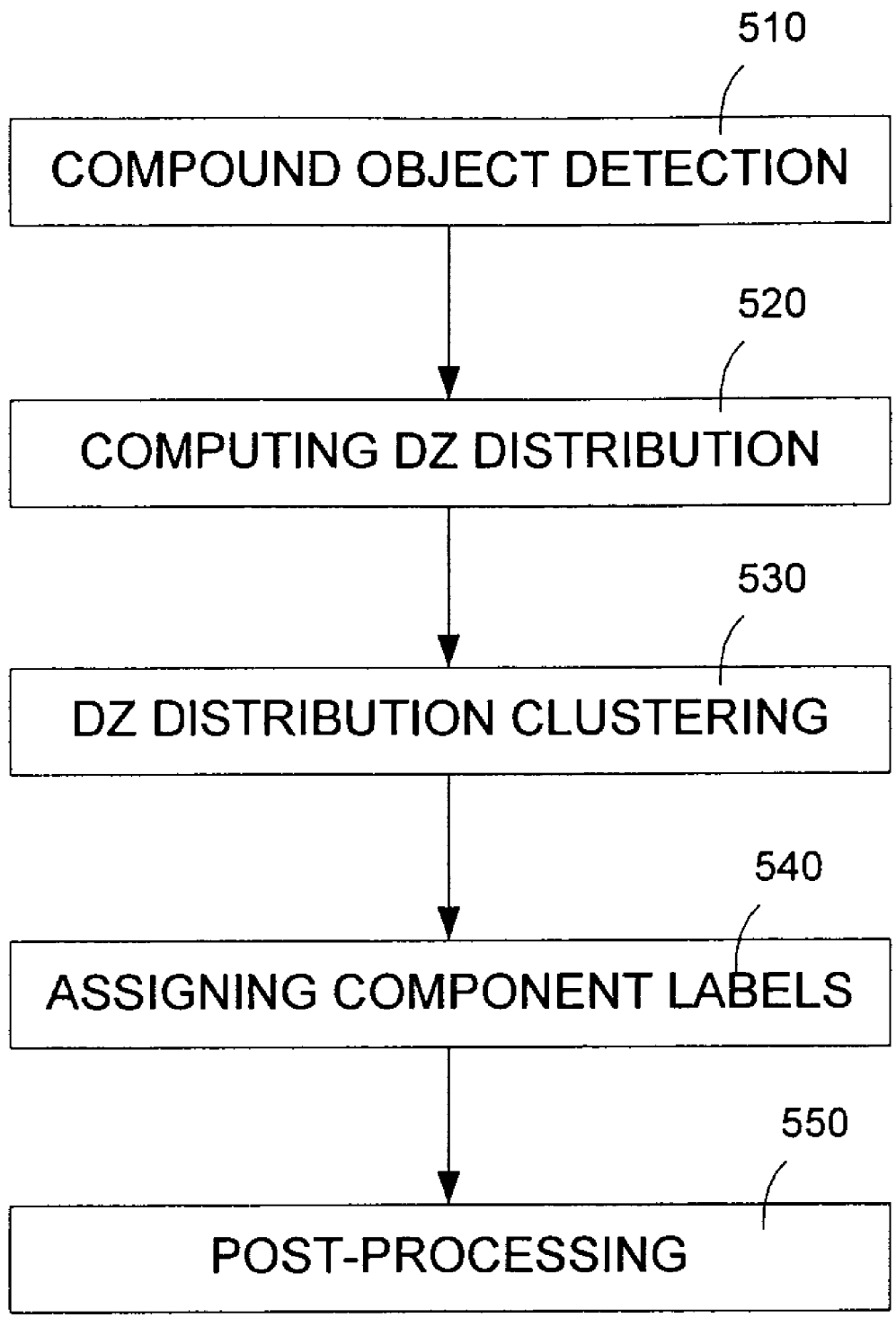
FIG. 8 contains a flow diagram of the logical flow of one embodiment of a compound object splitting method in accordance with the present disclosure.

FIG. 8 is the block diagram illustrating the logical flow of the compound object spitting step, which preferably comprises: compound object detection; computing DZ distribution; identifying clusters within the DZ distribution; assigning a component label to each object voxel based on the DZ distribution clusters; and post-processing.

In Step 510, compound object detection is first preferably performed to see if the segmented object is a compound object containing multiple component objects. The standard deviation of the density and the atomic number measurements of the input object are preferably used for the detection. When both standard deviations are higher than pre-determined thresholds, a compound object is detected; otherwise, the object is treated as a single object and can be directly discriminated by Step 306 of FIG. 6 if it is a sheet object or Step 308 of FIG. 6 if it is a bulk object.

If a compound object is detected, a DZ distribution is preferably computed in Step 520 of FIG. 8. The DZ distribution is a two dimensional density and atomic number histogram of the compound object. Let $H_1(m,n)(m=0, \ldots M-1, n=0, \ldots N-1)$ be the DZ distribution of a compound object O with label l; where M is the number of density bins and N is the number of atomic number bins. Then $H_1(m,n)$ is computed as follows, $$H_1(m,n) = \sum_{L_b(i,j,k)=l} \delta\left(\begin{array}{l} m - \left\lfloor \frac{C(i,j,k) - \rho_{his}^{min}}{\rho_{his}^{bin}} \right\rfloor, \\ n - \left\lfloor \frac{Z(i,j,k) - Z_{his}^{min}}{Z_{his}^{bin}} \right\rfloor \end{array}\right)$$

where $\lfloor x \rfloor$ is the largest integer no greater than x, $\rho_{his}^{min}$ is the minimum density value of the histogram, $\rho_{his}^{bin}$ is the density bin width of the histogram, $Z_{his}^{min}$ is the minimum Z value of the histogram, $Z_{his}^{bin}$ is the Z bin width of the histogram, and $\delta(m,n)$ is a 2D discrete impulse function as follows, $$\delta(m, n) = \begin{cases} 1, & m = 0, n = 0 \\ 0, & \text{otherwise} \end{cases}$$

Still in Step 520 of FIG. 8, the computed 2D histogram $H_1(m,n)$ is preferably filtered by an exponential smoothing kernel. The smoothing is performed to remove some local maxima in the histogram. Let $H_2(m,n)$ be the smoothed DZ distribution, and it is computed as follows, $$H_2(m, n) = \sum_{i=-N_{smooth}}^{N_{smooth}} \sum_{j=-N_{smooth}}^{N_{smooth}} H_1(m+i, n+j) e^{-\frac{i^2+j^2}{N_{smooth}}}$$

where $N_{smooth}$ is a pre-determined size of the smoothing kernel. Zero-padding to the input histogram $H_1(m,n)$ is used for handling the boundaries.

Next in Step 530 of FIG. 8, clustering is preferably performed to identify the number of the components of the compound object and the voxels associated with each component.

Figure 9:
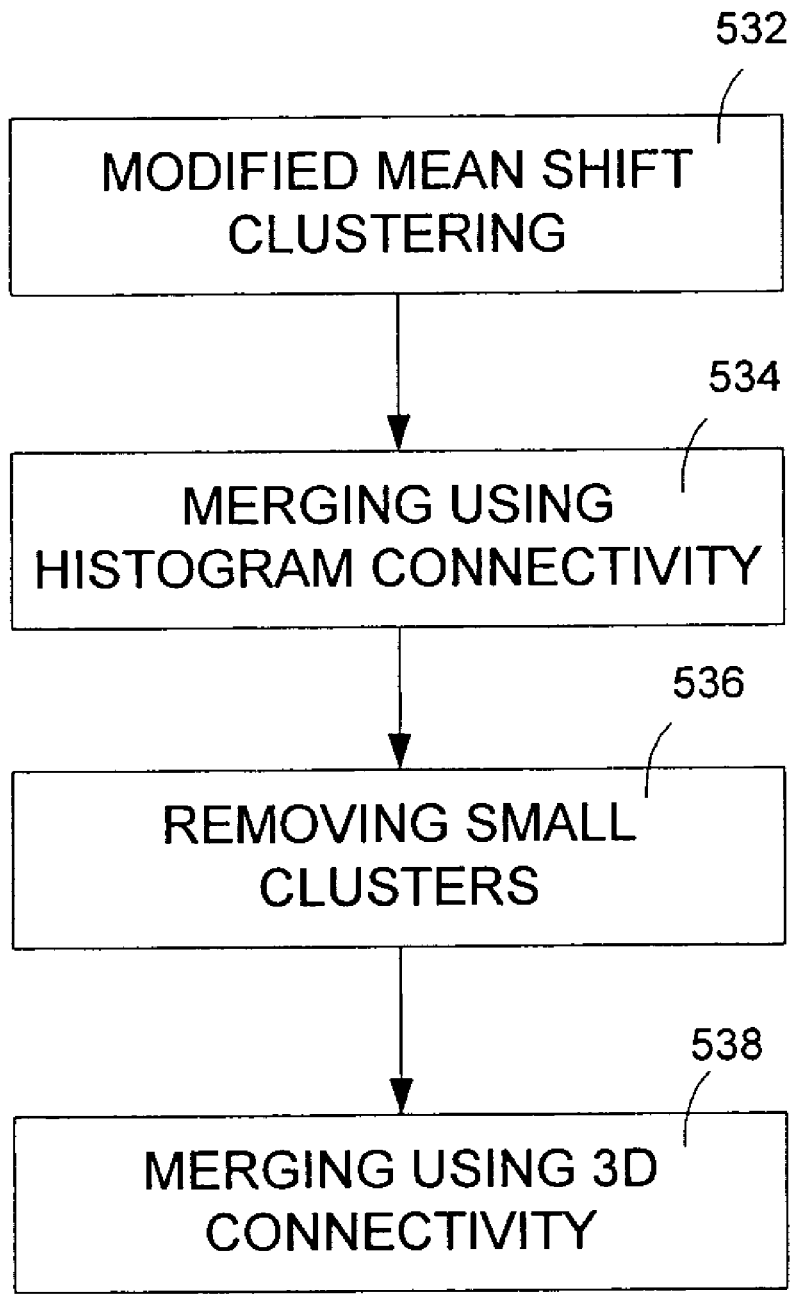
FIG. 9 contains a flow diagram of the logical flow of one embodiment of clustering using a DZ distribution in accordance with the present disclosure.

FIG. 9 is the block diagram illustrating the logical flow of the clustering step 530, which preferably comprises: modified mean shift clustering; merging using histogram connectivity; removing small clusters; and merging using 3D connectivity, as described in greater detail hereinafter.

In Step 532 of FIG. 9, clustering within the DZ distribution is preferably performed using a modified version of the mean shift method, as described in Dorin Comaniciu and Peter Meer, "Mean shift: A robust approach toward feature space analysis," IEEE trans. on Pattern Analysis and Machine Intelligence, vol. 24, no. 5, pp. 603-619, May 2002. The modified mean shift method is described below in detail. Let $L(m,n)$ be the histogram label array, and initialize to zero. Let $L_e(i)=i$ ($0 \leq i < L_m$) be a label equivalency array, where $L_m$ is the maximum number of the clusters possible in the histogram $H_2(m,n)$. For each histogram coordinate $(m,n)$, the following operations are preferably performed:

(a) If the smoothed histogram $H_2(m,n)$ is zero, or if the point is already labeled, i.e. $L(m,n)>0$, continue to the next point; otherwise, mark the point with a new label as follows, $$L(m, n) = 1 + \max_{i,j} L(i, j)$$

(b) Use an averaging kernel to compute a mean density and atomic number coordinate $(\overline{m},\overline{n})$ for the histogram points in the vicinity of the current point as follows, $$\overline{m} = \frac{\sum_{i=-N_{shift}}^{N_{shift}} \sum_{j=-N_{shift}}^{N_{shift}} (m+i) H_2(m+i, n+j)}{\sum_{i=-N_{shift}}^{N_{shift}} \sum_{j=-N_{shift}}^{N_{shift}} H_2(m+i, n+j)}$$

$$\overline{n} = \frac{\sum_{i=-N_{shift}}^{N_{shift}} \sum_{j=-N_{shift}}^{N_{shift}} (n+j) H_2(m+i, n+j)}{\sum_{i=-N_{shift}}^{N_{shift}} \sum_{j=-N_{shift}}^{N_{shift}} H_2(m+i, n+j)}$$

where $N_{shift}$ is a pre-determined size of the mean shift kernel. The boundaries are handled by zero-padding to the smoothed histogram $H_2(m,n)$.

(c) Calculate an attenuated shift vector $\Delta_{att}(m,n)$ as follows, $\Delta_{att}(m,n)=(\Delta_m,\Delta_n)$ where $\Delta_m = \text{sign}(\overline{m}-m)A \ln(1+B|\overline{m}-m|)$ $\Delta_n = \text{sign}(\overline{n}-n)A \ln(1+B|\overline{n}-n|)$ where A and B are pre-determined constants; and $$\text{sign}(x) = \begin{cases} 1, & x > 0 \\ 0, & x = 0 \\ -1, & x < 0 \end{cases}$$

Note that $(\overline{m}-m, \overline{n}-n)$ is the un-attenuated mean shift vector. The logarithmic attenuation function reduces the magnitude of a large shift vector and increases the magnitude of a small shift vector.

(d) Find the next histogram point $(m',n')$ of the current cluster by adding the attenuated shift vector to the histogram coordinates of the current point as follows, $m'=\lfloor m+\Delta_m+0.5 \rfloor$ $n'=\lfloor n+\Delta_n+0.5 \rfloor$ (e) If the label value of the new point $(m',n')$ is zero, i.e., $L(m',n')=0$ and the smoothed histogram value is greater than zero, i.e., $H_2(m',n')>0$, assign the current cluster label to the new point as follows, $L(m',n')=L(m,n)$ (f) If the new point $(m',n')$ is already labeled as belonging to another cluster, i.e., $L(m',n')>0$ and $L(m',n') \neq L(m,n)$, find the lowest equivalent label, $L_e^{min}(m',n')$, of that cluster $L(m',n')$, by following down the equivalency chain in the $L_e(i)$ array:

$L_e^{min}(m',n')=$first $L_e^k$ such that $L_e^k=L_e^{k-1}$     (A)

where $L_e^k=L_e(L_e^{k-1})$, and $L_e^1=L_e(L(m',n'))$.

After finding the lowest equivalent label, mark the equivalency of cluster labels $L(m',n')$ and $L(m,n)$ in the label equivalency array as follows, $L_e(L(m',n'))=L_e^{min}(m',n')$ and return to Step (a).

(g) Otherwise, examine the eight neighbors in the 3-by-3 square centered at the point $(m',n')$. If there are any labeled points, find the lowest equivalent cluster label with the maximum number of the points in the vicinity of the point $(m',n')$ by following steps:

i. Find the equivalent label, $L_n(i,j)$ $(-1 \leq i,j \leq 1)$ of each neighbor point $(m'+i,n'+j)$ as follows, $$L_n(i, j) = \begin{cases} 0, & L(m'+i, n'+j) = 0 \\ L_e^{min}(m'+i, n'+j) & L(m'+i, n'+j) > 0 \end{cases}$$

where $L_e^{min}(m'+i,n'+j)$ is computed according to Equation (A).

ii. For each labeled neighbor, count how many points have the same lowest equivalent label as follows:

$$N_n(i, j) = \sum_{i'=-1}^{1} \sum_{j'=-1}^{1} f(i', j') \quad (B)$$

where $$f(i', j') = \begin{cases} 1, & L_n(i, j) = L_n(i', j') \text{ and } L_n(i, j) > 0 \\ 0, & \text{otherwise} \end{cases}$$

iii. Find the highest count value in the vicinity, $N_{max}$, as follows, $$N_{max} = \max_{i,j} N_n(i, j)$$

iv. Find the lowest equivalent label that ahs the highest count, $L_n^{min}(m',n')$, as follows, $$L_n^{min}(m', n') = \min_{N_n(i,j)=N_{max}} L_n(i, j)$$

Note that the value of $L_n^{min}(m',n')$ is zero if none of the neighbors are labeled. If any of the neighbors is labeled, mark the current cluster label as equivalent to the $L_n^{min}(m',n')$ cluster:

$$L_e(L(m, n)) = \begin{cases} L_n^{min}(m', n'), & L_n^{min}(m', n') > 0 \\ L(m, n) & \text{otherwise} \end{cases}$$

Return to Step (a). Note that the point (m',n') could be within the current cluster, so that $L_n^{min}(m',n')$ is equal to L(m,n).

Still in Step 532 of FIG. 9, after each histogram point is labeled, the histogram points are relabeled according to the equivalency tree, which maintains the equivalency between different labels. Equivalency means that some of the different label values actually belong to a same cluster due to the growth procedure. The RELABELING step according to the equivalency tree is preferably performed as follows, (a) Find the maximum used label value, $L_{max}$, as follows, $$L_{max} = \max_{m,n} L(m, n)$$

(b) Set each entry in the equivalency array to the lowest equivalent value as follows, $$L_e(i) = L_e^{min}(i)$$

where $L_e^{min}(i)$ ($1 \leq i \leq L_{max}$) is computed according to Equation (A).

(c) Renumber the labels $L_e(i)$ ($0 \leq i \leq L_{max}$), as follows, $$L_e(i) = \begin{cases} 0, & i = 0 \\ L_e(L_e(i)), & i > 0 \text{ and } L_e(i) \neq i \\ 1 + \max_{j<i} L_e(j), & i > 0 \text{ and } L_e(i) = i \end{cases}$$

(d) Relabel the histogram points according to the renumbered equivalency array as follows, $$L(m,n) = L_e(L(m,n))$$

(e) Re-compute the number of assigned label values, $$L_{max} = \max_{m,n} L(m, n),$$

which is the number of clusters found by the modified mean shift method.

The clusters found by the modified mean shift method may comprise small isolated clusters, and a step following the modified mean shift method is preferably performed to merge these small isolated clusters to nearby larger clusters by computing cluster connectivity features in the histogram space. In Step 534, a weight of each cluster, denoted as W(i) ($1 \leq i \leq L_{max}$), is first computed as follows, $$W(i) = \sum_{L(m,n)=i} H_2(m, n)$$

Then, a cluster connectivity matrix, denoted as $C_h(i,j)$ ($1 \leq i, j \leq L_{max}$), in histogram space is preferably computed as follows, (a) Initialize the cluster connectivity matrix $C_h(i,j)=0$ ($1 \leq i, j \leq L_{max}$).

(b) For each labeled histogram point L(m,n)>0, use Equation (B) to calculate the number of neighboring points for with the same cluster $N_n(k,l)$($-1 \leq k,l \leq 1$).

(c) For every different cluster in the neighborhood, i.e., $L(m+k,n+l) \neq L(m,n)$ and $L(m+k,n+l)>0$, update the connectivity matrix as follows, $$C_h((L(m+k,n+l),L(m,n))=C_h((L(m+k,n+l),L(m,n))+N_u(k,l)$$

$$C_h((L(m,n),L(m+k,n+l))=C_h((L(m,n),L(m+k,n+l))+N_u(k,l)$$

where $N_u(k,l)$ is defined as follows, $$N_u(k, l) = \begin{cases} N_n(k, l), & N_n(k, l) \leq N_a \\ N_n(k, l)(1 + N_n(k, l)), & N_n(k, l) > N_a \end{cases}$$

where $N_a$ is a pre-determined constant.

After the connectivity matrix is computed, clusters which have a high connectivity value are merged as follows (MERGING step)

(a) For each cluster label i($1 \leq i \leq L_{max}$), find the highest connectivity value $$C_{max}(i) = \max_{1 \leq j \leq max} C_h(i, j)$$

$$n(i) = \min_{C_h(i,j)=C_{max}(i)} j$$

(b) Merge the two clusters i and n(i) if the connectivity-to-weight ratio $$\frac{C_{\max}(i)}{W(i)}$$

is greater than a pre-determined threshold $C_{merge}$ by changing the cluster equivalency array, $$L_e(\max(i,n(i)))=\min(i,n(i))$$

(c) Zero out the symmetrical element in the connectivity matrix as follows, $$C_h(n(i), i) = \begin{cases} 0, & \frac{C_{\max}(i)}{W(i)} > C_{merge} \\ C_h(n(i), i), & \text{otherwise} \end{cases}$$

(d) Relabel the clusters according to the new equivalency array as described in the RELABELING step previously.

Next in Step 536 of FIG. 9, small clusters are preferably removed if the areas of the clusters are less than a pre-determined threshold. Let A(i) be the area of cluster i, and A(i) is computed as follows, $$A(i) = \sum_{m,n} \delta(L(m, n) - i)$$

where $\delta(k)$ is a discrete impulse function as follows, $$\delta(k) = \begin{cases} 1, & k = 0 \\ 0, & k \neq 0 \end{cases}$$

A cluster is removed by setting the corresponding equivalent label to zero as follows, $$L_e(i) = \begin{cases} 0, & A(i) < A_{\min} \\ L_e(i), & A(i) \geq A_{\min} \end{cases}$$

where $A_{min}$ is a pre-determined minimum cluster area. Relabel the clusters according to the new equivalency array as described RELABELING step previously.

Next in Step 538 of FIG. 9, a 3D connectivity matrix is computed, and clusters are merged when two clusters have a high connectivity value. First associating the 3D label $L_{3D}(i, j, k)$ with the 2D DZ histogram label L(m,n) is performed as follows. Let $L_{obj}$ be the 3D label of the compound object for splitting in the 3D label image.

$$L_{3D}(i, j, k) = \begin{cases} L_{obj}, & L_{3D}(i, j, k) = L_{obj} \text{ and } L(m, n) = 1 \\ L_{3D}^{\max} + L(m, n) - 1, & L_{3D}(i, j, k) = L_{obj} \text{ and } L(m, n) > 1 \\ L_{3D}(i, j, k), & \text{otherwise} \end{cases}$$

where $$L_{3D}^{\max} = \max_{i,j,k} L_{3D}(i, j, k)$$

is the maximum object label in the 3D label image. The association of the histogram space and 3D space is determined through the following two equations:

$$m = \left\lfloor \frac{C(i, j, k) - \rho_{his}^{\min}}{\rho_{his}^{bin}} \right\rfloor, \quad n = \left\lfloor \frac{Z(i, j, k) - Z_{his}^{\min}}{Z_{his}^{bin}} \right\rfloor$$

A 3D cluster connectivity matrix, denoted as $C_{3D}(l,m)$ ($1 \leq l, m \leq L_{max}$), is computed as follows, (a) Initialize the connectivity matrix $C_{3D}(l,m)=0$ (b) For each voxel (i,j,k), find the corresponding histogram cluster label, $L_h(i,j,k)$ as follows, $$L_h(i, j, k) = \begin{cases} 1, & L(i, j, k) = L \\ L_{3D}(i, j, k) - L_{3D}^{\max} + 1 & L(i, j, k) > L_{3D}^{\max} \\ 0 & \text{otherwise} \end{cases}$$

(c) For each neighbor (i',j',k'), $-1 \leq i',j',k' \leq 1$, update the corresponding element of the connectivity matrix as follows, $$C_{3D}(L_h(i,j,k),L_h(i+i',j+j',k+k'))=C_{3D}(L_h(i,j,k),L_h(i+i',j+j',k+k'))+1$$

(d) Zero out diagonal elements and elements corresponding to cluster index of zero:

$$C_{3D}(l,0)=C_{3D}(0,l)=C_{3D}(l,l)=0$$

where $0 \leq l \leq L_{max}$.

After the 3D connectivity matrix is computed, the weight of each cluster W(l) ($1 \leq l \leq L_{max}$) is recomputed as follows, $$W(l)=\Sigma \delta(L_h(i,j,k)-l)$$

Lastly, the clusters with high connectivity value are merged as described previously in the MERGING step.

Next in Step 540 of FIG. 8, the 3D label image is relabeled using the updated equivalency label array as described previously in the RELABELING step.

Finally, the post-processing Step 550 comprises multiple rounds of counting erosion on the 3D label image to remove small thinly stretched parts of split components preferably using the following steps:

(a) For each object voxel (i,j,k), compute the number of neighbors, $N_e(i,j,k)$, that belong to the same object:

$$N_e(i, j, k) = \sum_{i',j',k'=-1}^{i',j',k'=1} \delta(L(i, j, k) - L(i+i', j+j', k+k'))$$

(b) Remove voxels that have low number $N_e(i,j,k)$, $$L_{3D}(i, j, k) = \begin{cases} 0, & L_{3D}(i, j, k) = L_{obj} \text{ and } N_e(i, j, k) < N_e^{min} \\ 0, & L_{3D}(i, j, k) > L_{3D}^{max} \text{ and } N_e(i, j, k) < N_e^{min} \\ L_{3D}(i, j, k), & \text{otherwise} \end{cases}$$

where $N_e^{min}$ is a pre-determined constant. Note that the erosion is applied only to the component objects split from the compound object.

While this disclosure has been particularly shown and described with references to preferred embodiments thereof, it will be understood by those skilled in the art that various changes in form and details may be made therein without departing from the spirit and scope of the disclosure as defined by the following claims.

What is claimed is:

1. A method of identifying components of an object defined as a plurality of volume elements (voxels) in volumetric multi-energy computed tomography (CT) data, each voxel being associated with a density value (D) and an atomic number value (Z), comprising:
    a. computing a distribution of object voxels by density and atomic number (DZ distribution);
    b. identifying clusters within the computed DZ distribution wherein identifying clusters within the computed DZ distribution comprises:
        i. using a modified version of the mean shift step method to find clusters of the DZ distribution, wherein using a modified version of the mean shift method includes the step of applying a function to the size of the mean shift step so that the magnitude of a large step is reduced, and the magnitude of a small step is increased,
        ii. computing cluster connectivity features; and
        iii. merging connected clusters;
    c. assigning a component label to each object voxel based on the DZ distribution clusters corresponding to the density and atomic number values associated with each voxel; and
    d. post-processing the set of voxels identified as belonging to each component.

2. A method of identifying components of an object defined as a plurality of volume elements (voxels) in volumetric multi-energy computed tomography (CT) data, each voxel being associated with a density value (D) and an atomic number value (Z), comprising:
    a. computing a distribution of object voxels by density and atomic number (DZ distribution);
    b. identifying clusters within the computed DZ distribution wherein identifying clusters within the computed DZ distribution comprises:
        i. using a modified version of the mean shift step method to find clusters of the DZ distribution,
        ii. computing cluster connectivity features, wherein computing cluster connectivity features and merging connected clusters comprises:
            1. identifying a plurality of neighboring DZ distribution points near the mean shift method convergence point for the current cluster;
            2. counting the number of neighboring points that belong to each cluster; and
            3. identifying the lowest cluster label with the maximum number of neighboring points and merging it with the current cluster
        iii. merging connected clusters;
    c. assigning a component label to each object voxel based on the DZ distribution clusters corresponding to the density and atomic number values associated with each voxel; and
    d. post-processing the set of voxels identified as belonging to each component.

3. A method of identifying components of an object defined as a plurality of volume elements (voxels) in volumetric multi-energy computed tomography (CT) data, each voxel being associated with a density value (D) and an atomic number value (Z), comprising:
    a. computing a distribution of object voxels by density and atomic number (DZ distribution);
    b. identifying clusters within the computed DZ distribution wherein identifying clusters within the computed DZ distribution comprises:
        i. using a modified version of the mean shift step method to find clusters of the DZ distribution,
        ii. computing cluster connectivity features, and
        iii. merging connected clusters,
        wherein computing cluster connectivity features and merging connected clusters comprises:
            1. Assigning a cluster connectivity value for each pair of clusters;
            2. Assigning a weight for each cluster;
            3. For each cluster, identifying the cluster with the highest connectivity value; and
            4. merging the two clusters with the ratio of the connectivity value over the cluster weight exceeding a predetermined threshold
    c. assigning a component label to each object voxel based on the DZ distribution clusters corresponding to the density and atomic number values associated with each voxel; and
    d. post-processing the set of voxels identified as belonging to each component.

4. The method of claim 3, wherein assigning a cluster connectivity value for each pair of clusters comprises:
    a. identifying points in the DZ distribution where the two clusters border each other;
    b. counting the total number of border points;
    c. for each border point belonging to a cluster, identifying a plurality of neighboring DZ distribution points;
    d. counting the number of neighboring points that belong to the other cluster;
    e. counting the number of border points where the count of neighboring points belonging to the other cluster exceeds a predetermined threshold; and
    f. computing the cluster connectivity value for the pair of clusters based on the total number of border points and on the number of border points where the count of neighboring points belonging to the other cluster exceeds a predetermined threshold.

5. The method of claim 3, wherein assigning a cluster connectivity value for each pair of clusters comprises:
    a. identifying object voxels in the CT data that have density and atomic number values corresponding to either of the two clusters;
    b. for each such voxel, identifying a plurality of neighboring voxels; and
    c. computing the cluster connectivity value for the pair of clusters based on the number of neighboring pairs of voxels in the CT data where one voxel has density and atomic number values corresponding to one of the two clusters and the other voxel has density and atomic number values corresponding to the other of the two clusters.

6. The method of claim 3, wherein the weight of each cluster is based on the number of DZ distribution points belonging to the cluster.

7. The method of claim 3, wherein the weight of each cluster is based on the number of CT data voxels that have density and atomic number values corresponding to the cluster.

8. A method of identifying components of an object defined as a plurality of volume elements (voxels) in volumetric multi-energy computed tomography (CT) data, each voxel being associated with a density value (D) and an atomic number value (Z), comprising:
   a. computing a distribution of object voxels by density and atomic number (DZ distribution
   b. identifying clusters within the computed DZ distribution;
   c. assigning a component label to each object voxel based on the DZ distribution clusters corresponding to the density and atomic number values associated with each voxel; and
   d. post-processing the set of voxels identified as belonging to each component, wherein post-processing the set of voxels belonging to each component comprises a plurality of counting erosion steps, each counting erosion step comprising, for each component voxel:
      1. identifying a plurality of neighboring voxels;
      2. counting the number of neighboring voxels that belong to the same component; and
      3. comparing the number of neighboring voxels that belonging to the same component with a predetermined threshold;
      4. If the number of neighboring voxels belonging to the same component does not exceed the predetermined threshold, removing the component voxel from the object.

9. A system for identifying components of an object defined as a plurality of volume elements (voxels) in volumetric multi-energy computed tomography (CT) data, each voxel being associated with a density value (D) and an atomic number value (Z), comprising:
   a. a computing module configured to compute a distribution of object voxels by density and atomic number (DZ distribution):
   b. an identification module configured to identify clusters within the computed DZ distribution, wherein the identification module is configured and arranged so as to
      1. use a modified version of a mean shift step method to find clusters of the DZ distribution;
      2. compute cluster connectivity features; and
      3. merge connected clusters, and
      4. apply a function to the size of the mean shift step so that the magnitude of a large step is reduced, and the magnitude of a small step is increased;
   c. a component labeling module configured to assign a component label to each object voxel based on the DZ distribution clusters corresponding to the density and atomic number values associated with each voxel; and
   d. a post-processing module configured to post process the set of voxels identified as belonging to each component.

10. A system for identifying components of an object defined as a plurality of volume elements (voxels) in volumetric multi-energy computed tomography (CT) data, each voxel being associated with a density value (D) and an atomic number value (Z), comprising:
   a. a computing module configured to compute a distribution of object voxels by density and atomic number (DZ distribution):
   b. an identification module configured to identify clusters within the computed DZ distribution, wherein the identification module is configured and arranged so as to:
      1. identify a plurality of neighboring DZ distribution points near the mean shift method convergence point for the current cluster;
      2. count the number of neighboring points that belong to each cluster; and
      3. identify the lowest cluster label with the maximum number of neighboring points and merging it with the current cluster;
   c. a component labeling module configured to assign a component label to each object voxel based on the DZ distribution clusters corresponding to the density and atomic number values associated with each voxel; and
   d. a post-processing module configured to post process the set of voxels identified as belonging to each component.

11. A system for identifying components of an object defined as a plurality of volume elements (voxels) in volumetric multi-energy computed tomography (CT) data, each voxel being associated with a density value (D) and an atomic number value (Z), comprising:
   a. a computing module configured to compute a distribution of object voxels by density and atomic number (DZ distribution);
   b. an identification module configured to identify clusters within the computed DZ distribution, wherein the identification module is configured and arranged so as to:
      1. assign a cluster connectivity value for each pair of clusters;
      2. assign a weight for each cluster;
      3. for each cluster, identify the cluster with the highest connectivity value; and
      4. merge the two clusters with the ratio of the connectivity value over the cluster weight exceeding a predetermined threshold
   c. a component labeling module configured to assign a component label to each object voxel based on the DZ distribution clusters corresponding to the density and atomic number values associated with each voxel; and
   d. a post-processing module configured to post process the set of voxels identified as belonging to each component.

12. The system claim 11, wherein the identification module is further configured and arranged so as to:
   a. identify points in the DZ distribution where the two clusters border each other;
   b. count the total number of border points;
   c. for each border point belonging to a cluster, identify a plurality of neighboring DZ distribution points;
   d. count the number of neighboring points that belong to the other cluster;
   e. count the number of border points where the count of neighboring points belonging to the other cluster exceeds a predetermined threshold; and
   f. compute the cluster connectivity value for the pair of clusters based on the total number of border points and on the number of border points where the count of neighboring points belonging to the other cluster exceeds a predetermined threshold.

13. The system of claim 11, wherein the identification module is further configured and arranged so as to:
   a. identify object voxels in the CT data that have density and atomic number values corresponding to either of the two clusters;
   b. for each such voxel, identify a plurality of neighboring voxels; and c. compute the cluster connectivity value for the pair of clusters based on the number of neighboring pairs of voxels in the CT data where one voxel has density and atomic number values corresponding to one of the two clusters and the other voxel has density and atomic number values corresponding to the other of the two clusters.

14. The system of claim 11, wherein the weight of each cluster is based on the number of DZ distribution points belonging to the cluster.

15. The system of claim 11, wherein the weight of each cluster is based on the number of CT data voxels that have density and atomic number values corresponding to the cluster.

16. A system for identifying components of an object defined as a plurality of volume elements (voxels) in volumetric multi-energy computed tomography (CT) data, each voxel being associated with a density value (D) and an atomic number value (Z), comprising:

a. a computing module configured to compute a distribution of object voxels by density and atomic number (DZ distribution);

b. an identification module configured to identify clusters within the computed DZ distribution;

c. a component labeling module configured to assign a component label to each object voxel based on the DZ distribution clusters corresponding to the density and atomic number values associated with each voxel; and d. a post-processing module configured to post process the set of voxels identified as belonging to each component, -wherein post-processing module is configured and arranged so as to:
      1. identifying a plurality of neighboring voxels for each component voxel;
      2. count the number of neighboring voxels that belong to the same component; and
      3. compare the number of neighboring voxels belonging to the same component with a predetermined threshold; and
      4. if the number of neighboring voxels belonging to the same component does not exceed the predetermined threshold, remove the component voxel from the object.

\* \* \* \* \*